(12) United States Patent
Viswanath et al.

(10) Patent No.: US 12,393,900 B2
(45) Date of Patent: Aug. 19, 2025

(54) APPARATUSES, METHODS, AND COMPUTER PROGRAM PRODUCTS FOR TRIGGERING APPLICATION COMPONENT WORKFLOWS BASED ON A DISTRIBUTED LEDGER

(71) Applicants: ATLASSIAN PTY LTD., Sydney (AU); ATLASSIAN US, INC., San Francisco, CA (US)

(72) Inventors: Sridatta Viswanath, Palo Alto, CA (US); Mdahaduzzaman Munna, Austin, TX (US); Krzysztof Barczynski, Palo Alto, CA (US); Patty Cifra, Austin, TX (US)

(73) Assignees: ATLASSIAN PTY, LTD., Sydney (AU); ATLASSIAN US, INC., San Francisco, CA (US)

( * ) Notice: Subject to any disclaimer, the term of this patent is extended or adjusted under 35 U.S.C. 154(b) by 252 days.

(21) Appl. No.: 17/849,229

(22) Filed: Jun. 24, 2022

(65) Prior Publication Data
US 2023/0419218 A1    Dec. 28, 2023

(51) Int. Cl.
*G06Q 10/0633*    (2023.01)
(52) U.S. Cl.
CPC ................. *G06Q 10/0633* (2013.01)
(58) Field of Classification Search
CPC .......................................... G06Q 10/00–50/00
USPC ............................................... 705/7.11–7.42
See application file for complete search history.

(56) References Cited

U.S. PATENT DOCUMENTS

| | | | |
|---|---|---|---|
| 10,282,689 B1 * | 5/2019 | Johnston | G06Q 10/103 |
| 10,659,219 B1 | 5/2020 | Ganeshmani et al. | |
| 10,698,767 B1 | 6/2020 | De et al. | |
| 10,846,299 B2 * | 11/2020 | Gaillardetz | G06F 16/258 |
| 10,855,475 B1 | 12/2020 | Leach et al. | |
| 10,880,074 B2 * | 12/2020 | Revankar | G06Q 20/02 |
| 11,178,151 B2 * | 11/2021 | Singh | H04L 63/102 |
| 11,205,178 B2 * | 12/2021 | Batra | G06Q 10/0633 |
| 2011/0252427 A1 * | 10/2011 | Olston | G06F 16/951 |
| | | | 718/102 |

(Continued)

OTHER PUBLICATIONS

Into to Ethereum, What is a Blockchain? [retrieved from Internet Nov. 4, 2022] (10 pages), https://ethereum.org/en/developers/docs/into-to-ethereum/#what-is-a-blockchain, Nov. 4, 2022.

(Continued)

*Primary Examiner* — Alan S Miller
(74) *Attorney, Agent, or Firm* — Alston & Bird LLP

(57) ABSTRACT

Methods, apparatuses, or computer program products provide for triggering application component workflows based on a distributed ledger. A candidate transaction associated with a defined workflow action for an application component is detected based at least on monitoring a workflow event stream. A candidate transaction data structure for the candidate transaction is also generated in accordance with one or more candidate transaction attributes of the candidate transaction. Additionally, execution of a smart contract of a distributed ledger is caused to add the candidate transaction data structure to the distributed ledger and a workflow for the application component is triggered based on the candidate transaction data structure being added to the distributed ledger.

54 Claims, 7 Drawing Sheets

(56) References Cited

U.S. PATENT DOCUMENTS

| | | | |
|---|---|---|---|
| 2015/0206106 A1 | 7/2015 | Yago | |
| 2017/0155515 A1 | 6/2017 | Androulaki et al. | |
| 2019/0205884 A1* | 7/2019 | Batra | G06Q 20/4014 |
| 2019/0236598 A1 | 8/2019 | Padmanabhan | |
| 2019/0356493 A1 | 11/2019 | Fisher et al. | |
| 2019/0379545 A1* | 12/2019 | Wong | H04L 9/3239 |
| 2019/0385172 A1 | 12/2019 | Jayaram et al. | |
| 2020/0112445 A1* | 4/2020 | Yoshihama | G06Q 20/02 |
| 2020/0118131 A1 | 4/2020 | Diriye et al. | |
| 2020/0119905 A1 | 4/2020 | Revankar et al. | |
| 2020/0183950 A1* | 6/2020 | Gaillardetz | G06F 16/258 |
| 2020/0327546 A1 | 10/2020 | Pennington et al. | |
| 2020/0374113 A1 | 11/2020 | Noam et al. | |
| 2020/0394648 A1 | 12/2020 | Blackshear et al. | |
| 2020/0409940 A1 | 12/2020 | Gu et al. | |
| 2021/0049306 A1 | 2/2021 | Yang et al. | |
| 2021/0182848 A1* | 6/2021 | Benko | G06Q 20/3829 |
| 2021/0263908 A1 | 8/2021 | Saito | |
| 2021/0278823 A1 | 9/2021 | Sauer et al. | |
| 2021/0390549 A1 | 12/2021 | Rule et al. | |
| 2022/0198394 A1* | 6/2022 | Chandra | H04L 63/0807 |
| 2022/0337570 A1 | 10/2022 | Larish | |
| 2022/0398131 A1* | 12/2022 | Rakshit | G06F 9/5077 |
| 2023/0123346 A1* | 4/2023 | Quigley | G06Q 20/342 705/65 |
| 2023/0306116 A1* | 9/2023 | Husson | G06F 21/57 |
| 2023/0360032 A1* | 11/2023 | Lee | G06Q 20/12 |
| 2023/0421395 A1* | 12/2023 | Viswanath | G06F 16/27 |

OTHER PUBLICATIONS

Introduction to Dapps, ethereum.org. [retrieved from Internet Nov. 4, 2022] (9 pages), Sep. 26, 2022, https://ethereum.org/en/developers/docs/dapps/.

Introduction to Smart Contracts [retrieved from Internet Nov. 4, 2022] (8 pages), https://ethereum.org/en/developers/docs/smart-contracts/.

Thoma, Martin, The Blockchain. An Introduction to Blockchain, Bitcoin . . . (17 pages), Jan. 12, 2021, https://medium.com/coinmonks/the-blockchain-473aac352e5, Nov. 4, 2022.

Web2 vs Web3, ethereum.org [retrieved from Internet Nov. 4, 2022] (8 pages), Sep. 26, 2022, https://ethereum.org/en/developers/docs/web2-vs-web3/.

Final Rejection Mailed on Sep. 12, 2024 for U.S. Appl. No. 17/849,221, 47 page(s).

Final Rejection Mailed on Jan. 29, 2025 for U.S. Appl. No. 17/849,209, 50 page(s).

Mitra, A et al. "TimeFabric: Trusted Time for Permissioned Blockchains." OpenAccess Series in Informatics, 2021. Print. Accessed via: https://drops.dagstuhl.de/storage/01oasics/oasics-vol092-fab2021/OASIcs.FAB.2021.4/OASIcs.FAB.2021.4.pdf (Year: 2021).

Non-Final Rejection Mailed on Feb. 19, 2025 for U.S. Appl. No. 17/849,221, 44 page(s).

Final Rejection Mailed on Jul. 8, 2025 for U.S. Appl. No. 17/849,221, 46 pages.

* cited by examiner

APPARATUSES, METHODS, AND COMPUTER PROGRAM PRODUCTS FOR TRIGGERING APPLICATION COMPONENT WORKFLOWS BASED ON A DISTRIBUTED LEDGER

BACKGROUND

Conventional server systems can be associated with untrusted data, difficult traceability of data, security vulnerabilities, and/or inefficient usage of computing resources. Through applied effort, ingenuity, and innovation, these identified deficiencies and problems have been solved by developing solutions that are configured in accordance with the embodiments of the present disclosure, many examples of which are described in detail herein.

BRIEF SUMMARY

Various other embodiments are also described in the following detailed description and in the attached claims.

In an embodiment, an apparatus comprises one or more processors and one or more storage devices storing instructions that are operable, when executed by the one or more processors, to cause the one or more processors to detect, based at least on monitoring a workflow event stream, a candidate transaction associated with a defined workflow event for an application component. The instructions are also operable, when executed by the one or more processors, to cause the one or more processors to generate a candidate transaction data structure for the candidate transaction in accordance with one or more candidate transaction attributes of the candidate transaction. The instructions are also operable, when executed by the one or more processors, to cause the one or more processors to cause execution of a smart contract of a distributed ledger to add the candidate transaction data structure to the distributed ledger in accordance with a distributed ledger consensus protocol based on a comparison between the one or more candidate transaction attributes and smart contract rules for the smart contract. Adding the candidate transaction data structure to the distributed ledger renders at least the defined workflow event within the workflow immutable. The instructions are also operable, when executed by the one or more processors, to cause the one or more processors to trigger a workflow for the application component based on the candidate transaction data structure being added to the distributed ledger.

In another embodiment, a computer-implemented method provides for detecting, based at least on monitoring a workflow event stream, a candidate transaction associated with a defined workflow event for an application component. The computer-implemented method also provides for generating a candidate transaction data structure for the candidate transaction in accordance with one or more candidate transaction attributes of the candidate transaction. The computer-implemented method also provides for causing execution of a smart contract of a distributed ledger to add the candidate transaction data structure to the distributed ledger in accordance with a distributed ledger consensus protocol based on a comparison between the one or more candidate transaction attributes and smart contract rules for the smart contract, where adding the candidate transaction data structure to the distributed ledger renders at least the defined workflow event within the workflow immutable. The computer-implemented method also provides for triggering a workflow for the application component based on the candidate transaction data structure being added to the distributed ledger.

In yet another embodiment, a computer program product is provided. The computer program product is stored on a computer readable medium, comprising instructions that when executed by one or more computers cause the one or more computers to detect, based at least on monitoring a workflow event stream, a candidate transaction associated with a defined workflow event for an application component. The instructions, when executed by the one or more computers, also cause the one or more computers to generate a candidate transaction data structure for the candidate transaction in accordance with one or more candidate transaction attributes of the candidate transaction. The instructions, when executed by the one or more computers, also cause the one or more computers to cause execution of a smart contract of a distributed ledger to add the candidate transaction data structure to the distributed ledger in accordance with a distributed ledger consensus protocol based on a comparison between the one or more candidate transaction attributes and smart contract rules for the smart contract. Adding the candidate transaction data structure to the distributed ledger renders at least the defined workflow event within the workflow immutable. The instructions, when executed by the one or more computers, also cause the one or more computers to trigger a workflow for the application component based on the candidate transaction data structure being added to the distributed ledger.

BRIEF DESCRIPTION OF THE SEVERAL VIEW OF THE DRAWINGS

Having thus described some embodiments in general terms, references will now be made to the accompanying drawings, which are not drawn to scale, and wherein:

DETAILED DESCRIPTION OF VARIOUS EMBODIMENTS

Figure 1:
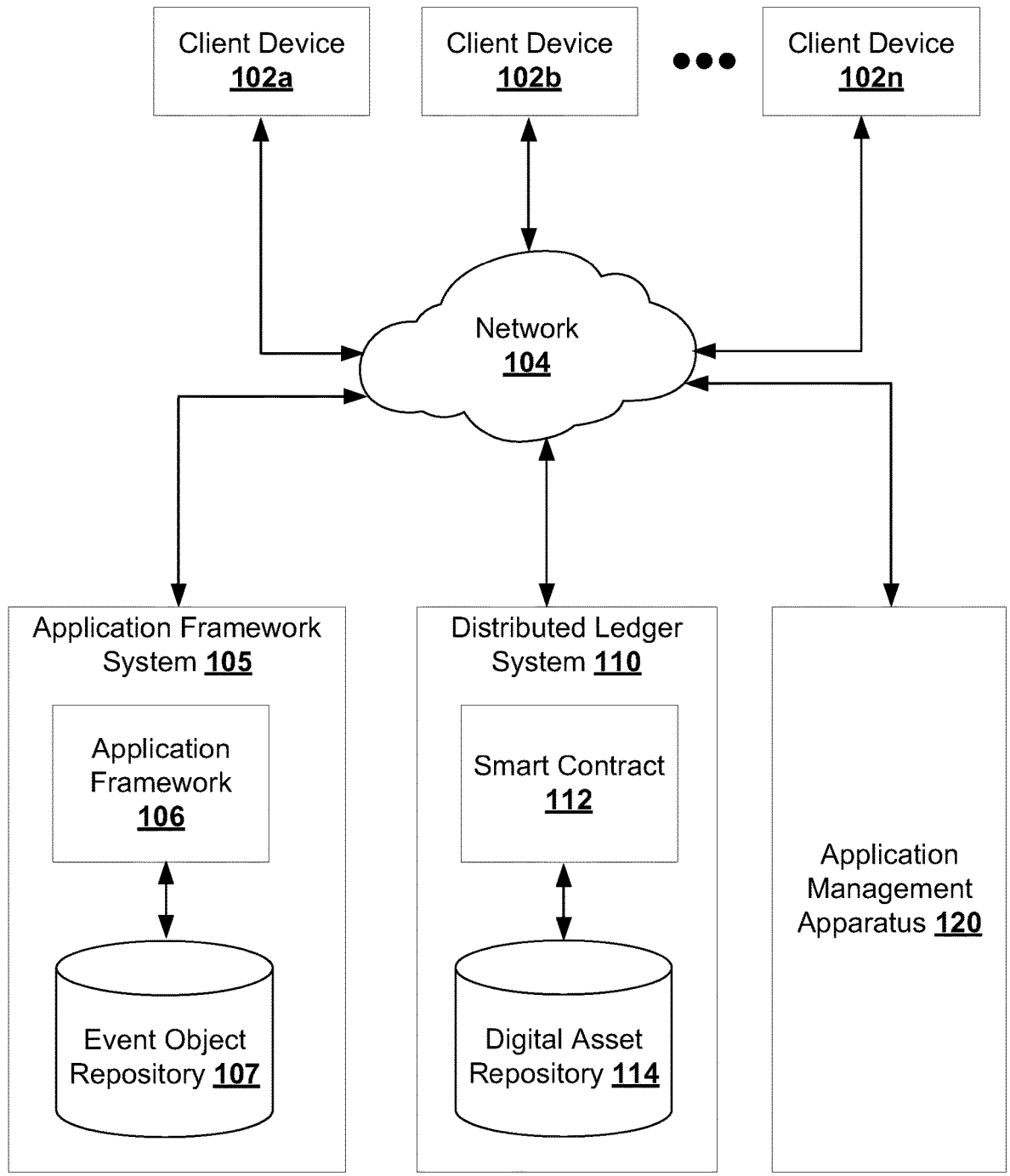
FIG. 1 is a block diagram of an example system within which one or more embodiments of the present disclosure may operate.

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present disclosure address technical problems associated with efficiently and reliably managing server systems such as, for example, collaborative applications provided via a server system. The disclosed techniques can be provided by an application management apparatus integrated with a distributed ledger system and an application framework system where multiple components/resources and/or layers of components/resources interact with one another in several complex manners to provide collaborative applications and/or collaborative services.

An application framework (e.g., a cloud application framework) is typically characterized by a large number of the application components (e.g., services, micro services, and the like) that are offered by the application framework. One example application framework might include an enterprise instance of Jira®, an action tracking and project management software platform, developed by Atlassian Pty. Ltd. that may be licensed to Beta Corporation. Other software platforms may serve as application frameworks (e.g., Confluence®, Trello®, Bamboo®, Clover®, Crucible®, etc. by Atlassian Pty. Ltd).

Modern application frameworks are designed to possess complex service architectures and are deployed at scale to large enterprise user bases. Because of this scale and the numerosity of the application components, a large number of data objects may be generated by the application framework at most any time interval. These created data objects may be generated for a variety of purposes and can be difficult to track due to the sheer volume data objects and due to the complexity of the application framework. For example, the application framework may be configured as a project management application framework and data objects may be generated as a result of workflow processes and/or collaborative software development provided by the application framework.

Data objects generated by an application framework may relate to the application framework itself such as, for example, data objects indicating software events, incidents, changes, workflow actions, agreed upon portions of collaborative documents and/or software code, electronic agreements, component requests, alerts, or other notifications. However, data objects generated by an application framework may also relate to business or enterprise that has deployed or licensed the application framework such as, for example, process events, workflow events, milestones, goals, schedule events, alerts, corporate objectives, employee objectives, employee actions, and the like.

Given the complexity and scale of modern application frameworks, it can be difficult to manage and optimize data requirements and/or computing resources related to application components of such application frameworks. It is generally also difficult to integrate certain portions of workflows with other workflows and/or application components of an application framework such that workflows are unchangeable, securely saved, and/or automated. For example, consider a scenario in which it is desirable for Beta Corporation to manage portions of a project management process (or another type of application component process) by triggering one or more new workflows when certain types of workflow actions are "closed" or transparently "secured." However, traditional project management processes and/or workflows generally lack efficient automation for generating workflows, and often result in the collection of untrusted data, difficult traceability of data, security vulnerabilities, inefficient usage of computing resources, and/or other technical drawbacks. Moreover, with traditional project management processes and/or workflows, a third-party entity (e.g., an unauthorized user, an unauthorized system, a hacker, etc.) may access and alter one or more portions of a project management process and/or workflow. For example, a third-party entity may be capable of "spoofing" related to triggering an event, changing a condition, or another alteration with respect to a project management process and/or workflow, Additionally, given the complexity, scale, and/or amount of data employed for modern application frameworks, it is generally difficult to manage and/or obtain meaningful insights from data related to project management processes and/or workflows of such application frameworks. Data immutability with respect to project management processes and/or workflows within a traditional architecture for such application frameworks is also difficult to achieve.

To address the above-described challenges related to managing server systems, various embodiments of the present disclosure are directed to systems, apparatuses, methods and/or computer program products for triggering application component workflows based on a distributed ledger. For instance, a transaction being stored by a distributed ledger can trigger generation of one or more application component workflows. In various embodiments, workflow operations and/or other actions tracked by a distributed ledger can trigger one or more workflows for one or more application components. In certain embodiments, one or more workflows for one or more application components can additionally or alternatively be triggered based on digital assets associated with workflow operations tracked by a distributed ledger being stored in a digital asset repository. Moreover, a consensus mechanism of the distributed ledger system such as, for example, a proof-of-work protocol, can provide a decentralized distributed ledger for triggering application component workflows.

An application component workflow can represent one or more processes related to a project management application, a work management application, a service management application, a software development application, a product development application, a portfolio management application, a collaborative application, or another type of application provided by an application framework. In various embodiments, one or more workflow actions may be dependent upon a distributed ledger such that completion of a workflow action may result in one or more portions of the workflow action becoming immutable via the distributed ledger. In various embodiments, data related to the workflow action can be stored via the distributed ledger. For instance, dynamic portions and/or static portions of an application component workflow (or another type of workflow) can be managed such that the portions of the workflow are immutable (e.g., "closed" or transparently "secured") by a distributed ledger. Additionally, in various embodiments, trust mechanisms and immutability for application component workflows can be provided while also providing transparency for data related to application component workflows.

In certain embodiments, predetermined workflow actions can be automatically detected based on monitoring of one or more event streams associated with an application framework. Data related to workflow actions can also be stored via a distributed ledger to provide improved trust, transparency, traceability, security, and/or quality of data associated with workflow actions. By employing a distributed ledger to manage and/or generate workflows related to an application framework, computing resources and/or memory allocation with respect to processing and storage of data for the application framework can also be improved. Moreover, triggering application component workflows based on a distributed ledger can enable faster and/or more efficient iteration of workflow development using smart contracts. A distributed ledger as disclosed herein can also provide for improved efficiency and/or a reduced amount of data with respect to monitoring events related to application component workflows. Smart contracts and/or a related consensus mechanisms for a distributed ledger of the distributed ledger system can also trigger application component workflows in a decentralized manner.

In certain embodiments, a digital asset repository can be configured to store and/or manage respective digital assets related to immutable portions of workflows related to an application framework. For example, the digital asset repository can be a digital wallet (e.g., a blockchain wallet) that enables storage and/or management of respective digital assets. In various embodiments, a digital asset can be a digital token such as, for example, a non-fungible token (NFT), a fungible token, a digital token, cryptocurrency, or other digital data stored in a digital ledger of the digital ledger system. In a non-limiting example, a digital asset can be an NFT that employs a smart contract associated with an ERC-72 NFT standard or another type of NFT standard. In another non-limiting example, a digital asset can be a fungible token that employs a smart contract associated with an ERC-20 token standard, an ERC-1155 multi-token standard, or another type of token standard.

In certain embodiments, workflow actions associated with micro-incentives can be automatically detected based on monitoring of one or more workflow event streams associated with the application framework. In various embodiments, a micro-incentive can be configured as a micro-digital asset for storage in the digital asset repository. In various embodiments, one or more workflows for one or more application components can be triggered in response to defined incentive thresholds (e.g., defined digital asset thresholds) being satisfied. In various embodiments, respective micro-digital assets can be configured based on a predefined rule set associated with predefined events with respect to the application framework. The predefined rule set can be configured based on particular goals and/or types of events related to the application framework. In various embodiments, the predefined rule set can be additionally or alternatively configured based on user input provided via user devices.

In various embodiments, the application framework can include components (e.g., application components, application micro-components, services, microservices, etc.) and a workflow event stream associated with the components can be monitored to trigger execution of transactions and/or smart contracts for the distributed ledger system. Components of the application framework may include, for example, components related to one or more layers of the application framework. In one or more embodiments, the application framework may facilitate remote collaboration between components. In one or more embodiments, the distributed ledger system employs a database associated with workflow event streams to track different components, relationships between the components, relationships between client identifiers (e.g., user identifiers) associated with the components, ownership of the components, metadata for the components, and/or other information associated with the components. In one or more embodiments, the distributed ledger system interacts with components, applications, and/or tools of the application framework to synchronize data into the database. In one or more embodiments, the distributed ledger system additionally or alternatively provides an event management platform to enable collection of data objects for various workflow event streams.

In some embodiments, the component management system provides an Application Programming Interface (API) approach to interact with the distributed ledger system and/or an application management system integrated with the distributed ledger system. For instance, in some embodiments, the component management system can provide an API-driven user interface to enable interaction with the distributed ledger system, the application management system, and/or the digital asset repository. In one or more embodiments, the user interface provides a visualization of related digital assets stored in the digital asset repository. The user interface can additionally or alternatively provide a visualization to enable configuration of respective rules for smart contracts configured for respective workflows related to an application framework.

By using the described techniques, various embodiments of the present disclosure provide triggering of application component workflows based on a distributed ledger that can be used to increase efficiency and/or effectiveness of an application framework system and/or a distributed ledger system. In doing so, various embodiments of the present disclosure make substantial technical contributions to improving the efficiency and/or the effectiveness of an application framework system and/or a distributed ledger system. Various embodiments of the present disclosure additionally or alternatively provide richer ownership context, improved usability, improved data quality, improved interactions, improved processes, improved workflows, improved remote collaborations with respect to workflows related to an application framework.

Definitions

As used herein, the terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client device," "computing device," "network device," "computer," "user equipment," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client device" may refer to computer hardware and/or software that is configured to access a component made available by a server. The server is often, but not always, on another computer system, in which case the client accesses the component by way of a network. Embodiments of client devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "server computing device" refers to a combination of computer hardware and/or software that is configured to provide a component to a client device. An example of a server computing device is the application framework system 105 of FIG. 1. Another example of a server computing device is, in certain embodiments, the distributed ledger system 110 of FIG. 1. Another example of a server computing device is, in certain embodiments, the application management apparatus 120 of FIG. 1. In some embodiments, a server computing device communicates with one or more client computing devices using one or more computer networks.

The term "circuitry" may refer to: hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose-built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The term "application framework" refers to a computing environment associated with one or more computing devices and one or more components (e.g., one or more application components), where the environment enables interactions with respect to components supporting at least one application. For example, an application framework can be a system (e.g., a server system, a cloud-based system, an enterprise system, etc.) where multiple components, multiple resources associated with components, multiple layers of components, and/or multiple layers of resources interact with one another in several complex manners. In some embodiments, the components are associated directly or indirectly with an application supported by the components. In some embodiments, the components can support the application over one or more communication networks. The application framework can include one or more components to generate and update a repository of collected information for each component (e.g., an event object repository). Accordingly, the application framework can provide for the collection of information, in the form of event objects, to facilitate monitoring of event streams associated with one or more components of the application framework. In certain embodiments, the application framework can be configured as an action tracking and/or project management software platform. In certain embodiments, the application framework can be configured to manage one or more project management applications, one or more work management applications, one or more service management applications, one or more software development applications, one or more product development applications, one or more portfolio management applications, one or more collaborative applications, or one or more other types of applications. In certain embodiments, the application framework can be configured as an enterprise instance of an action tracking and/or project management software platform. However, it is to be appreciated that, in other embodiments, the application framework can be configured as another type of component platform.

The term "application framework system" refers to a system that includes both a server framework and a repository to support the server framework. For example, an application framework refers to a system that includes a computing environment associated with one or more computing devices and one or more components, as well as a repository of collected information for each component and/or each computing device.

The term "application," "app," or similar terms refer to a computer program or group of computer programs designed for use by and interaction with one or more networked or remote computing devices. In some embodiments, an application refers to a mobile application, a desktop application, a command line interface (CLI) tool, or another type of application. Examples of an application comprise workflow engines, component desk incident management, team collaboration suites, cloud components, word processors, spreadsheets, accounting applications, web browsers, email clients, media players, file viewers, videogames, and photo/video editors. An application can be supported by one or more components either via direct communication with the component or indirectly by relying on a component that is in turn supported by one or more other components.

The term "component" or "component application" refers to a computer functionality or a set of computer functionalities, such as the retrieval of specified information or the execution of a set of operations, with a purpose that different clients can reuse for their respective purposes, together with the policies that should control its usage, for example, based on the identity of the client (e.g., an application, another component, etc.) requesting the component. Additionally, a component may support, or be supported by, at least one other component via a component dependency relationship. For example, a translation application stored on a smartphone may call a translation dictionary component at a server in order to translate a particular word or phrase between two languages. In such an example the translation application is dependent on the translation dictionary component to perform the translation task.

In some embodiments, a component is offered by one computing device over a network to one or more other computing devices. Additionally, the component may be stored, offered, and utilized by a single computing device to local applications stored thereon and in such embodiments a network would not be required. In some embodiments, components may be accessed by other components via a plurality of APIs, for example, JavaScript Object Notation (JSON), Extensible Markup Language (XML), Simple Object Access Protocol (SOAP), Hypertext Markup Language (HTML), the like, or combinations thereof. In some embodiments, components may be configured to capture or utilize database information and asynchronous communications via message queues (e.g., Event Bus). Non-limiting examples of components include an open source API definition format, an internal developer tool, web based HTTP components, databased components, and asynchronous message queues which facilitate component-to-component communications.

In some embodiments, a component can represent an operation with a specified outcome and can further be a self-contained computer program. In some embodiments, a component from the perspective of the client (e.g., another component, application, etc.) can be a black box (e.g., meaning that the client need not be aware of the component's inner workings). In some embodiments, a component may be associated with a type of feature, an executable code, two or more interconnected components, and/or another type of component associated with an application framework.

In some embodiments, a component may correspond to a service. Additionally or alternatively, in some embodiments, a component may correspond to a library (e.g., a library of components, a library of services, etc.). Additionally or alternatively, in some embodiments, a component may correspond to one or more modules. Additionally or alternatively, in some embodiments, a component may correspond to one or more machine learning models. For example, in some embodiments, a component may correspond to a service associated with a type of service, a service associated with a type of library, a service associated with a type of feature, a service associated with an executable code, two or more interconnected services, and/or another type of service associated with an application framework.

The term "service" refers to a type of component. In some embodiments, a service provides a visual representation of one or more data structures. In some embodiments, a service is configured for viewing data, searching for data, creating data, updating data, managing relationships among data, assigning attributes related to data, and/or storing data associated with one or more data structures. In some embodiments, a service is configured as a system, tool or product to facilitate viewing data, searching for data, creating data, updating data, managing relationships among data, assigning attributes related to data, and/or storing data associated with one or more data structures. In some embodiments, a service comprises a set of metadata attributes associated with a technical capability, a technical configuration, an application capability, an application configuration, and/or another metadata attribute. In some embodiments, a service is published to one or more client devices via one or more APIs. In some embodiments, a service is a logical representation of an application stack. In some embodiments, a service corresponds to one or more microservices.

The term "microservices" refers to a set of services that are interconnected and independently configured to provide a monolith service. In some embodiments, a microservice is configured with one or more APIs integrated with one or more other microservices and/or one or more other applications. In some embodiments, a microservice is a single-function module with a defined set of interfaces and/or a defined set of operations configured to integrate with one or more other microservices and/or one or more other applications to provide a monolith service.

The term "library" refers to a collection of objects (e.g., a collection of component objects, a collection of service objects, etc.), a collection of functions, and/or a collection of processing threads associated with one or more components.

The term "workflow" refers to a set of actions that represent one or more processes related to an application framework and/or one or more components. A workflow can include a set of statuses and/or a set of transitions that represent one or more processes. For example, a status can represent a state of an action and/or a task performed with respect to an application framework and/or one or more components. A transition can represent a link between status. Actions for a workflow can be configured to dynamically alter a current status of a workflow and/or to initiate a transition.

The term "workflow event" refers to one or more actions, interactions with, and/or one or more changes related to a workflow of an application framework and/or one or more components. For example, a workflow event can be triggered by one or more actions, interactions with, and/or one or more changes related to an application framework and/or one or more components. In various embodiments, a workflow event can correspond to a defined workflow action within a workflow. For example, a workflow event can correspond to a workflow step, a status, or a transition within a workflow. In one or more embodiments, a workflow event refers to one or more actions, interactions with, and/or one or more changes related to one or more project management applications, one or more work management applications, one or more service management applications, one or more software development applications, one or more product development applications, one or more portfolio management applications, one or more collaborative applications, or one or more other types of applications. In some embodiments, a workflow event may be associated with metadata, a unique identifier, one or more attributes, one or more tags, one or more classifications, one or more source identifiers, one or more object types, software data, and/or other context data. In some embodiments, a workflow event may be related to and/or triggered via one or more actions, interactions with, and/or one or more changes related to a project management processes, a workflow, or an electronic document. In some embodiments, an event may be related to and/or triggered via one or more client devices that interact with one or more components. For example, in some embodiments, a workflow event can be related to one or more actions and/or one or more changes initiated via a display screen of a client device. In some embodiments, a workflow event may be related to a user satisfying objectives, goals, and/or milestones related to a business or enterprise such as, for example, team objectives, corporate objectives, employee objectives, or the like where a client device provides a respective signal to an application framework and/or one or more components to indicate such event being satisfied. Additionally or alternatively, in some embodiments, a workflow event may be triggered via one or more components and/or one or more user identifiers. In some embodiments, a workflow event may be associated with a workflow event stream. For example, a workflow event stream can corresponds to aggregated workflow events where a workflow event is related to and/or aggregated with one or more other workflow events.

The term "workflow event stream" refers to a collection of workflow events related to one or more components and/or one or more user identifiers. For example, a workflow event stream can include a first workflow event associated with at least one component, a second workflow event associated with the at least one component, a third workflow event associated with the at least one component, etc. In certain embodiments, a workflow event stream refers to a collection of workflow events related to a project management application, a work management application, a service management application, a software development application, a product development application, a portfolio management application, a collaborative application, or another type of application. In certain embodiments, a workflow event stream can include one or more workflow vector data structures related to one or more workflow events.

The term "candidate transaction" refers to a temporary block of data created using data from at least a portion of one or more workflow vector data structures. For example, a candidate transaction can be a temporary block of data created using metadata related to one or more workflow vector data structures. In certain embodiments, a candidate transaction can be created based on a workflow event stream associated with one or more workflow events. In various embodiments, a candidate transaction can be associated with one or more predefined actions and/or changes with respect to one or more components. In various embodiments, a candidate transaction can be related to a candidate data structure to add to a distributed ledger.

The term "workflow vector data structure" refers to a combination of component objects (e.g., one or more component objects within a component dependency work graph structure) related to a particular workflow. For example, in some embodiments, a workflow vector data structure may include a set of component objects that provide data for a particular workflow. In some embodiments, a workflow vector data structure may include metadata and/or other data related to a workflow.

The term "distributed ledger" refers to a database that is distributed and/or synchronized across multiple network nodes such as, for example, multiple node computing entities. In certain embodiments, a distributed ledger can be a blockchain.

The term "candidate transaction data structure" refers to a data object for a set of data. In various embodiments, a candidate transaction data structure can be a data block or another data item set that stores data and/or metadata associated with a candidate transaction. For example, a candidate transaction data structure can be configured in accordance with one or more candidate transaction attributes of a candidate transaction. In various embodiments, a candidate transaction data structure can be configured according to a defined format for a smart contract. In some embodiments, a candidate transaction attribute may comprise an array of name and value pairs with properties associated with the candidate transaction. In some embodiments, a candidate transaction data structure can represent a web component provided by a server to a plurality of other computing devices over a wired and/or wireless network and, as such, the component object can contain properties associated with the web component such as an IP address, API, or the like.

The term "smart contract" refers to a set of instructions that is executed via a distributed ledger and/or a distributed ledger system. For example, a smart contract can include a set of instructions and data that resides at a specific network address on a distributed ledger. In various embodiments, a smart contract can be configured based on smart contract rules.

The term "smart contract rule" refers to a rule related to adding data structures to a distributed ledger. In certain embodiments, a smart contract rule can correspond to a predefined rule associated with a predefined workflow event for one or more components. In certain embodiments, a smart contract rule can correspond to a predefined rule associated with a predefined workflow event for a project management application, a work management application, a service management application, a software development application, a product development application, a portfolio management application, a collaborative application, or another type of application. In various embodiments, a smart contract rule can be a predefined rule embedded into the smart contract. Additionally, a smart contract rule set can define criteria for initiating execution of the set of instructions of smart contract. In various embodiments, the smart contract rule set can be determined based on one or more owners (e.g., a decentralized autonomous organization) of the smart contract. For example, the smart contract rule set can be determined based on one or more user identifiers related to a project management application, a work management application, a service management application, a software development application, a product development application, a portfolio management application, a collaborative application, or another type of application. Additionally or alternatively, the smart contract rule set can be determined based on an application framework system related to a collaborative document, collaborative software development, and/or another type of collaborative application. In certain embodiments, a smart contract rule can be configured based on one or more latency requirements for a workflow, one or more defined workflow actions for a workflow, and/or one or more other attributes related to a workflow. In certain embodiments, a smart contract rule can initiate generation of a digital asset and/or a micro-digital asset for a predefined event.

The term "collaborative document" refers to a document that is configured for viewing and/or editing by two or more user identifiers via an application framework (e.g., a server system, a cloud-based system, an enterprise system, etc.). For example, a collaborative document can be configured for simultaneous viewing and/or editing via an application framework. In various embodiments, a collaborative document can be a collaborative document of a collaborative document application. Additionally a collaborative document can correspond to one or more components configured with a computer functionality or a set of computer functionalities related to collaborative document viewing and/or editing.

The term "digital asset repository" refers to a database stored on a memory device which is accessible by one or more client devices for retrieval, storage, and/or management of one or more of digital assets. In some embodiments, a digital asset repository may be stored on a server remotely accessible by a client device or on a memory device onboard the client device. In certain embodiments, a digital asset repository is configured as a digital wallet such as, for example, a digital token wallet.

The term "digital asset" refers to a digital token such as, for example, a non-fungible token (NFT), cryptocurrency, or other digital data stored in a digital ledger.

The term "micro-digital asset" refers to a digital token that is provided to one or more user identifiers based on behavior with respect to an application framework. In certain embodiments, a micro-digital asset can correspond to and/or can initiate generation of a digital award, digital imagery, a financial award, a digital recognition, an employment benefit, or another type of incentive to increase likelihood of certain types of interactions with respect to the application framework.

The term "redeemable digital asset" refers to a digital token that is redeemable and/or configured to be exchanged for non-digital content or an alternate form of digital content. In various embodiments, a redeemable asset is associated with a unique network address and/or a redeemable private key. In various embodiments, a redeemable digital asset can be associated with a "full" incentive related to one or more components of an application framework.

The term "user identifier" refers to one or more items of data by which a particular user of the application framework may be uniquely identified. For example, a user identifier can correspond to a particular set of bits or a particular sequence of data that uniquely identifies a user. In various embodiments, a user identifier corresponds to a user that is authorized to view, edit and/or work simultaneously on one or more workflows related to a project management application, a work management application, a service management application, a software development application, a product development application, a portfolio management application, a collaborative application, or another type of application.

The terms "internal component," "internal resource," or similar terms refer to a program, application, platform, or component that is configured by a developer to provide functionality to another one or more of their programs, applications, platforms, or components, either directly or indirectly through one or more other components, as opposed to using an external component. Internal components operate on a compiled code base or repository that is at least partially shared by an application which utilizes the functionality provided by the internal component. In some embodiments, the application code base and the internal component code base are hosted on the same computing device or across an intranet of computing devices. An application communicates with internal components within a shared architectural programming layer without external network or firewall separation. In some embodiments, an internal component is used only within the application layer which utilizes the internal components functionality. Information related to internal components can be collected and compiled into component objects which can also be referred to as internal component objects. An example embodiment of an internal component is a load balancer configured for routing and mapping API and/or component locations. Internal components may be configured for information-based shard routing, or in other words, routing and mapping API and/or component locations based on predefined custom component requirements associated with an application. For example, an internal component may be configured to identify where communication traffic originates from and then reply to the communications utilizing another component for reply communication.

The terms "external component," "external resource," "remote resource," or similar terms refer to a program, application, platform, or component that is configured to communicate with another program, application, platform, or component via a network architecture. In some embodiments, communications between an external component and an application calling the external component takes place through a firewall and/or other network security features. The external component operates on a compiled code base or repository that is separate and distinct from that which supports the application calling the external component. The external components of some embodiments generate data or otherwise provide usable functionality to an application calling the external component. In other embodiments, the application calling the external component passes data to the external component. In some embodiments, the external component may communicate with an application calling the external component, and vice versa, through one or more application program interfaces (APIs). For example, the application calling the external component may subscribe to an API of the external component that is configured to transmit data. In some embodiments, the external component receives tokens or other authentication credentials that are used to facilitate secure communication between the external component and an application calling the external component in view of the applications network security features or protocols (e.g., network firewall protocols). An example embodiment of an external component may include cloud components (e.g., AWS®).

The term "interaction signal" refers to a signal received by one or more computing devices (e.g., servers, systems, platforms, etc.) which are configured to cause an application framework system to perform one or more actions associated with one or more workflows and/or one or more components of the application framework system. The interaction signal may be received via a component management interface, an API, a communication interface, the like, or combinations thereof. In one or more embodiments, the interaction signal may be generated by a client device via one or more computer program instructions. In various embodiments, an interaction signal can be generated via a workflow, a collaborative document, a project management application, a work management application, a service management application, a software development application, a product development application, a portfolio management application, a collaborative application, or another type of process related to an application framework. Additionally or alternatively, the interaction signal may be cause one or more actions, one or more changes, and/or one or more authorizations with respect to a workflow, a collaborative document, a project management application, a work management application, a service management application, a software development application, a product development application, a portfolio management application, a collaborative application, or another type of process related to an application framework.

The term "request" refers to a particular type of interaction signal configured to indicate a request to commit a candidate transaction to a distributed ledger. A request can be associated with a user identifier authorized to interact with a workflow, a collaborative document a project management application, a work management application, a service management application, a software development application, a product development application, a portfolio management application, a collaborative application, or another type of process related to an application framework.

The term "interface element" refers to a rendering of a visualization and/or human interpretation of data associated with an application framework and/or a distributed ledger system. In one or more embodiments, an interface element may additionally or alternatively be formatted for transmission via one or more networks. In one or more embodiments, an interface element may include one or more graphical elements and/or one or more textual elements.

The term "visualization" refers to visual representation of data to facilitate human interpretation of the data. In some embodiments, visualization of data includes graphic representation and/or textual representation of data.

The term "graphical control element" refers to a computer input element that allows a user to enter input to facilitate one or more actions with respect to an application framework.

The term "interface area" refers to an area of an electronic interface, where the area may be situated in relation to one or more other interface areas of the electronic interface. An interface area may be comprised of groupings of pixels, or may be defined according to coordinates of a display device configured to render the interface. A size of an interface may be adjusted according to parameters associated with the display device. An interface area may include one or more interface elements. For example, an interface element may include a visualization. In certain embodiments, an interface area may include one or more graphical elements and/or or more textual elements. In certain embodiments, an interface area may be void of an interface element and/or a visualization. In certain embodiments, an interface area may include a graphical control element and/or one or more other interactive interface elements.

The term "immutable" refers to a portion of a workflow and/or data associated therewith that is prevented from being changed or edited based on the portion and/or the data being stored via a distributed ledger.

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, the like or any combination of the aforementioned devices.

FIG. 1 illustrates an example system architecture 100 within which embodiments of the present disclosure may operate. The system architecture 100 includes an application framework system 105 configured to interact with one or more client devices 102a-n, such as client device 102a, client device 102b, and/or client device 102n. In one or more embodiments, the one or more client devices 102a-n may be configured to interact with one or more components managed by an application framework 106 of the application framework system 105. For example, in one or more embodiments, the one or more client devices 102a-n may be configured to send data to the one or more components managed by the application framework 106 and/or receive data from the one or more components managed by the application framework 106. In one or more embodiments, the one or more components can be related to one or more workflows, a collaborative document, collaborative software development, and/or another type of application provided by the application framework 106. The system architecture 100 also includes a distributed ledger system 110 and/or an application management apparatus 120. In an embodiment, the application management apparatus 120 is implemented separate from the distributed ledger system 110 and the application framework system 105. Alternatively, in certain embodiments, the distributed ledger system 110 can include the application management apparatus 120. Alternatively, in certain embodiments, the application framework system 105 can include the application management apparatus 120. In various embodiments, the distributed ledger system 110 and/or the application management apparatus 120 can also be configured to interact with the one or more client devices 102a-n. In one or more embodiments, the distributed ledger system 110 can include a smart contract 112 and/or a digital asset repository 114. In various embodiments, the digital asset repository 114 can be associated with one or more states of a distributed ledger of the distributed ledger system 110. Alternatively, the digital asset repository 114 can be implemented as a logically separate element with respect to a distributed ledger of the distributed ledger system 110.

The application framework system 105, the distributed ledger system 110, the digital asset management system 120, and/or the one or more client devices 102a-n may be in communication using a network 104. Additionally or alternatively, in various embodiments, the application framework system 105, the distributed ledger system 110, and/or the application management system 120 may be in communication via a backend network and/or an enterprise network separate from the one or more client devices 102a-n. The network 104 may include any wired or wireless communication network including, for example, a wired or wireless local area network (LAN), personal area network (PAN), metropolitan area network (MAN), wide area network (WAN), the like, or combinations thereof, as well as any hardware, software and/or firmware required to implement the network 104 (e.g., network routers, etc.). For example, the network 104 may include a cellular telephone, an 802.11, 802.16, 802.20, and/or WiMAX network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. In some embodiments, the protocol is a custom protocol of JSON objects sent via a Web Socket channel. In some embodiments, the protocol is JSON over RPC, JSON over REST/HTTP, the like, or combinations thereof.

A client device from the one or more client devices 102a-n may include a mobile device, a smart phone, a tablet computer, a laptop computer, a wearable device, a personal computer, an enterprise computer, a virtual reality device, or another type of computing device. In one or more embodiments, a client device from the one or more client devices 102a-n includes geolocation circuitry configured to report a current geolocation of the client device. In some embodiments, the geolocation circuitry of the client device may be configured to communicate with a satellite-based radio-navigation system such as the global position satellite (GPS), similar global navigation satellite systems (GNSS), or combinations thereof, via one or more transmitters, receivers, the like, or combinations thereof. In some embodiments, the geolocation circuitry of the client device may be configured to infer an indoor geolocation and/or a sub-structure geolocation of the client device using signal acquisition and tracking and navigation data decoding, where the signal acquisition and tracking and the navigation data decoding is performed using GPS signals and/or GPS-like signals (e.g., cellular signals, etc.). Other examples of geolocation determination include Wi-Fi triangulation and ultra-wideband radio technology.

In one or more embodiments, the application framework system 105 may be configured to receive one or more interaction signals from one or more of the client devices 102a-n. An interaction signal refers to a signal configured to cause one or more actions with respect to the application framework 106. For example, an interaction signal can be a signal configured to cause one or more actions with respect to one or more workflows managed by the application framework 106. An interaction signal may be generated by the one or more client devices 102a-n and may be received via a component management interface of the application framework 106, an API of the application framework 106, a communication interface of the application framework 106, the like, or combinations thereof. Based on the one or more interaction signals, the application framework system 105 may perform one or more actions with respect to the application framework 106. In various embodiments, the one or more actions can be associated with one or more workflow events with respect to one or more components of the application framework 106. For example, the one or more actions can initiate and/or correspond to one or more workflow events with respect to one or more components of the application framework 106. In certain embodiments, the one or more actions can be associated with one or more workflow events with respect to one or more project management applications, one or more work management applications, one or more service management applications, one or more software development applications, one or more product development applications, one or more portfolio management applications, one or more collaborative applications, or one or more other types of applications managed by the application framework 106.

In various embodiments, the application framework system 105 may include an event object repository 107 associated with the one or more events. The event object repository 107 may store event data for one or more event objects related to one or more workflow events associated with the application framework 106. For example, the event object repository 107 may store data associated with one or more workflow event streams for one or more component objects associated with the application framework 106. The event object repository 107 may include one or more storage units, such as multiple distributed storage units that are connected through a computer network. Each storage unit in the event object repository 107 may store at least one of one or more data assets and/or one or more data about the computed properties of one or more data assets. Moreover, each storage unit in the event object repository 107 may include one or more non-volatile storage or memory media including but not limited to hard disks, ROM, PROM, EPROM, EEPROM, flash memory, MMCs, SD memory cards, memory sticks, CBRAM, PRAM, FeRAM, NVRAM, MRAM, RRAM, SONOS, FJG RAM, Millipede memory, racetrack memory, the like, or combinations thereof.

In one or more embodiments, the event object repository 107 can be configured as cache memory integrated into a microprocessor. For example, in one or more embodiments, the event object repository 107 can be configured as a Level 1 (L1) cache memory to maintain latency requirements for the application framework 106. In one or more embodiments, the data stored in the event object repository 107 can be employed to generate one or more candidate transactions associated with one or more components of the application framework 106. The one or more candidate transactions can be, for example, one or more candidate transactions for one or more distributed ledgers associated with the distributed ledger system 110. The distributed ledger system 110 may be configured to perform one or more distributed ledger processes based on the data stored in the event object repository 107. In various embodiments, the distributed ledger system 110 may be configured to execute the smart contract 112 and/or cause execution of the smart contract 112 based on the data stored in the event object repository 107. The smart contract 112 can be a smart contract for a distributed ledger associated with the distributed ledger system 110. In various embodiments, the smart contract 112 can be deployed via the distributed ledger associated with the distributed ledger system 110. For example, the smart contract 112 can reside at a defined network address on the distributed ledger. Alternatively, the smart contract 112 can be deployed via another portion of the distributed ledger system 110 in communication with the distributed ledger. For example, in certain embodiments, the smart contract 112 can be deployed via a virtual machine of the distributed ledger system 110.

The application management apparatus 120 can employ data and/or insights with respect to the application framework system 105 to perform one or more actions with respect to the distributed ledger system 110. In various embodiments, the application management apparatus 120 can monitor workflow vector data structures associated with respective workflows within an application component of an application framework. For example, the application management apparatus 120 can monitor and/or analyze workflow vector data structures stored in the event object repository 107. In various embodiments, the application management apparatus 120 can detect, from a workflow event stream associated with the event object repository 107, one or more defined workflow actions within an application component.

In one or more embodiments, in response to the one or more defined workflow actions satisfying workflow action criteria for the application component, the application management apparatus 120 can determine, for a distributed ledger, a candidate transaction associated with the one or more defined workflow actions. In certain embodiments, in response to the one or more defined workflow actions satisfying workflow action criteria for the application component, the application management apparatus 120 can receive a request to commit a candidate transaction associated with the first workflow vector data structure and the second workflow vector data structure to a distributed ledger of the distributed ledger system 110. In response to the request satisfying defined authorization criteria, the application management apparatus 120 can generate a candidate transaction data structure for the candidate transaction in accordance with one or more candidate transaction attributes of the candidate transaction. Additionally, the application management apparatus 120 can cause execution of the smart contract 112 to add the candidate transaction data structure to the distributed ledger. The defined authorization criteria can be, for example, a determination that a first timestamp associated with the request is within a defined interval of time. Additionally or alternatively, the defined authorization criteria can be a determination that device data for a client device associated with the request corresponds to authorized device data for candidate transactions related to the smart contract 112. The one or more smart contract rules can be one or more rules determined by the smart contract 112. For example, the one or more smart contract rules can be one or more rules for one or more predefined events with respect to components of the application framework 106 that qualify as an authorized data block for the distributed ledger associated with the distributed ledger system 110.

The smart contract 112 can be executed based on comparison between the one or more candidate transaction attributes and smart contract rules for the smart contract. In various embodiments, the smart contract rules can be one or more rules for one or more predefined workflow events with respect to the application framework 106 that qualify as an authorized data block for the distributed ledger associated with the distributed ledger system 110. In various embodiments, the smart contract rules for the smart contract 112 can be predetermined smart contract rules associated with the application framework 106. In certain embodiments, the smart contract rules for the smart contract 112 can be configured by one or more user identifiers authorized with respect to an application component. Additionally or alternatively, the smart contract rules for the smart contract 112 can be configured based on one or more latency requirements for a workflow within an application component of the application framework 106. Additionally or alternatively, the smart contract rules for the smart contract 112 can be configured based on one or more defined workflow actions for a workflow within an application component of the application framework 106.

In various embodiments, the application management apparatus 120 can manage one or more digital assets stored in the digital asset repository 114. In various embodiments, the application management apparatus 120 can modify the digital asset repository 114 based on a data block being added to the distributed ledger associated with the distributed ledger system 110. The digital asset management apparatus 120 can additionally manage conversion of digital assets (e.g., micro-digital assets) in the digital asset repository 114 into a redeemable digital asset for a user identifier associated with the client devices 102*a-n*. One or more workflows can also be generated based on a number of digital assets stored in the digital asset repository 114 and/or conversion of digital assets in the digital asset repository 114. For example, one or more new workflows can be triggered when a given digital asset threshold for the digital asset repository 114 is reached.

Figure 2:
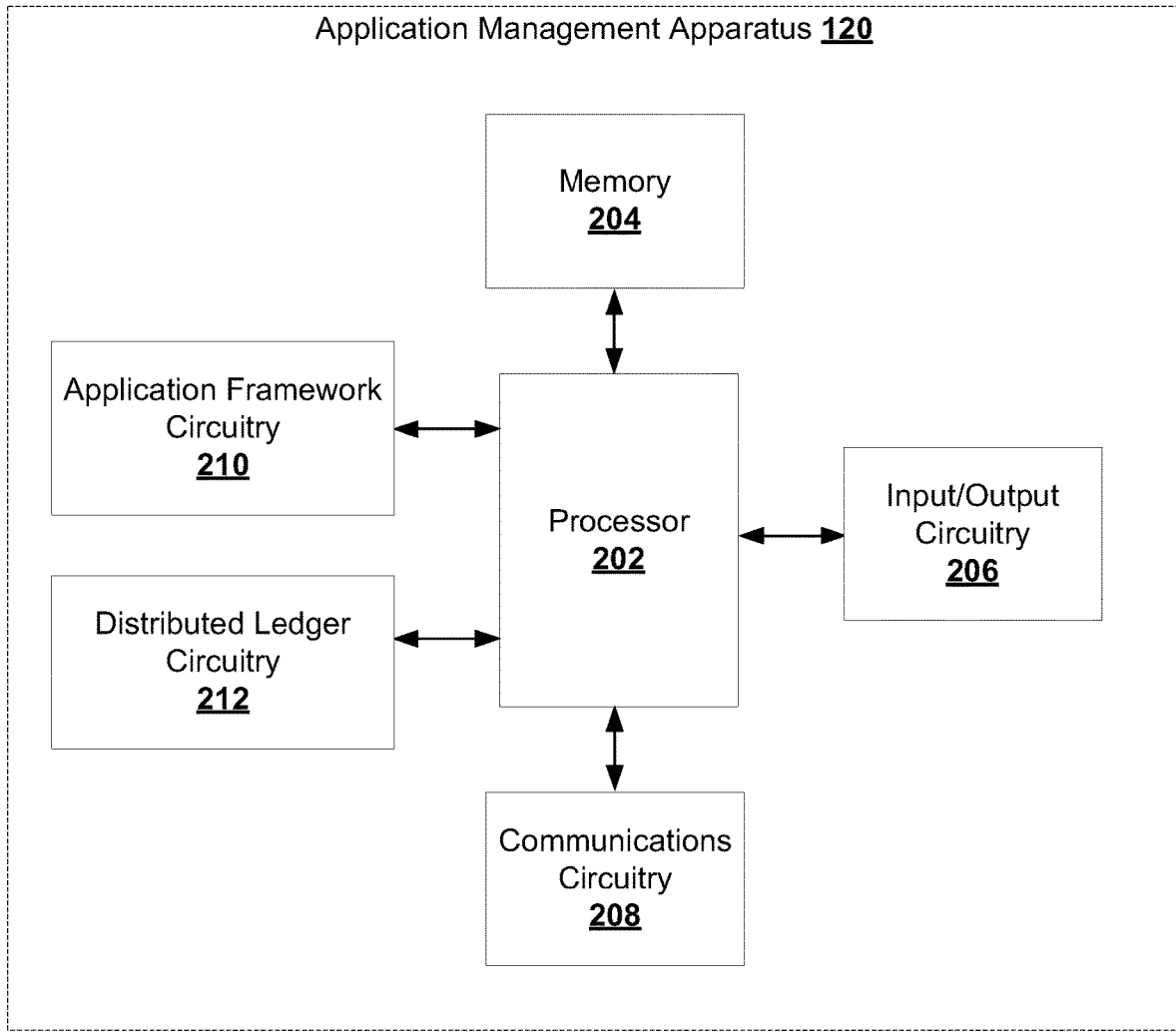
FIG. 2 is a block diagram of an example application management apparatus configured in accordance with one or more embodiments of the present disclosure.

The application management apparatus 120 may be embodied by one or more computing systems, such the application management apparatus 120 illustrated in FIG. 2. In one or more embodiments, the application management apparatus 120 may include processor 202, memory 204, input/output circuitry 206, communications circuitry 208, collaborative application framework circuitry 210, and distributed ledger circuitry 212. The application management apparatus 120 may be configured to execute the operations described herein. Although these components 202-212 are described with respect to functional limitations, it should be understood that the particular implementations necessarily include the use of particular hardware. It should also be understood that certain of these components 202-212 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In some embodiments, the application management apparatus 120 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the application management apparatus 120. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The application framework circuitry 210 may be any means such as a device or circuitry embodied in either hardware or a combination of hardware and software that is configured to interact with the application framework system 105. In various embodiments, the application framework circuitry 210 may monitor, analyze, and/or process data associated with the application framework system 105 such as, for example, workflow data stored in the event object repository 107 and/or data related to a collaborative document. For example, in various embodiments, the application framework circuitry 210 may monitor workflow event streams associated with the application framework 106 to detect respective workflow actions (e.g., defined workflow actions) and/or workflow vector data structures related to components of the application framework 106. In certain embodiments, the application framework circuitry 210 may be configured to retrieve metadata associated with the application framework 106 and/or the event object repository 107 to facilitate detection of respective workflow actions and/or workflow vector data structures related to components of the application framework 106. The metadata may include, for example, data associated with relationships, sources, targets, ownership, consumption, libraries, activities, attributes, incidents, actions, workflow events, communication channels, dashboards, data repositories, labels, descriptions, and/or other data related to the application framework 106 and/or the event object repository 107.

In some embodiments, to facilitate monitoring of workflow event streams, the application framework circuitry 210 can be configured to ping one or more computing devices of the application framework 106, such as via an internet control message protocol, to receive information related to one or more components of the application framework 106. In some embodiments, to obtain event objects associated with the one or more components, the application framework circuitry 210 utilizes the communications circuitry 208 to transmit one or more API calls to one or more API servers associated with the noted client devices.

In some embodiments, the event object repository 107 may comprise one or more of a single unified repository, a single partitioned repository, or a plurality of isolated repositories comprising one or more partitions. An example embodiment of event object repository 107 may comprise separate partitions for isolating information for respective user identifiers associated with a defined portion of the digital asset repository 114. The application framework circuitry 210 may also be configured to generate access logs and/or historical data including information associated with a particular user identifier, computing device, component, the like, or combinations thereof. Historical data may include component activity records for a particular time interval.

The distributed ledger circuitry 212 may be any means such as a device or circuitry embodied in either hardware or a combination of hardware and software that is configured to interact with the distributed ledger system 110. In various embodiments, the distributed ledger circuitry 212 may be configured to interact with the smart contract 112 and/or the digital asset repository 114. In one or more embodiments, the distributed ledger circuitry 212 may execute the smart contract 112 or cause execution of the smart contract 112 based on a comparison between a candidate transaction and a predefined rule set associated with predefined events for one or more components of the application framework 106. For example, the distributed ledger circuitry 212 may execute the smart contract 112 or cause execution of the smart contract 112 based on a comparison between one or more candidate transaction attributes for the candidate transaction and predefined rule set associated with predefined workflow events for one or more components of the application framework 106. In certain embodiments, the distributed ledger circuitry 212 may also manage digital assets stored in the digital asset repository 114. For example, the distributed ledger circuitry 212 may modify the digital asset repository 114 based on data blocks for candidate transactions being added to a distributed ledger of the distributed ledger system 110. Additionally, one or more new workflows for one or more components of the application framework 106 can be generated based on the digital assets stored in the digital asset repository 114 and/or modification of the digital asset repository 114.

In some embodiments, one or more external systems (such as a remote cloud computing and/or data storage system) may also be leveraged to provide at least some of the functionality discussed herein.

Figure 3:
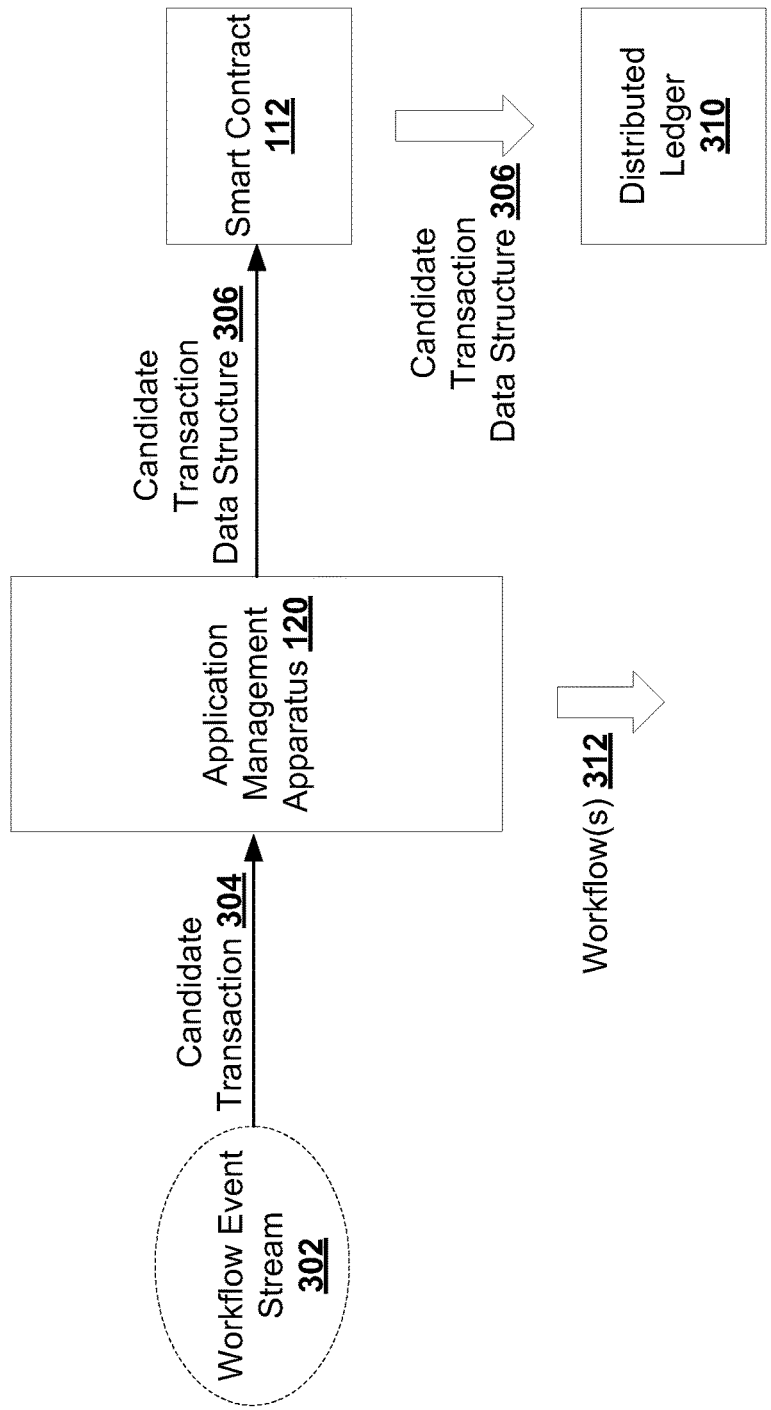
FIG. 3 illustrates an example system for triggering application component workflows based on a distributed ledger in accordance with one or more embodiments of the present disclosure.

Referring to FIG. 3, an example system 300 is presented in accordance with one or more embodiments of the present disclosure. The system 300 includes the application management apparatus 120. In one or more embodiments, the application management apparatus 120 such as, for example, the application framework circuitry 210 of the application management apparatus 120, can determine a candidate transaction 304 related to a workflow event stream 302.

The workflow event stream 302 can include data for one or more workflow events associated with the application framework 106. For example, the workflow event stream 302 can include data for one or more workflow events associated with one or more components of the application framework 106. The candidate transaction 304 can therefore be associated with one or more components of the application framework 106. In various embodiments, the workflow event stream 302 can be associated with a particular user identifier. Additionally or alternatively, the workflow event stream 302 can be associated with a group of user identifiers including the particular identifier and one or more other user identifiers. In one or more embodiments, the workflow event stream 302 can include workflow vector data structures associated with respective workflows within one or more application components of the application framework 106. For example, the application management apparatus 120 can monitor the workflow event stream 302 to identify and/or determine at least one workflow vector data structure associated with at least one defined workflow action within an application component. The defined workflow action can, for example, correspond to at least a portion of a workflow within the application component. In certain embodiments, the defined workflow action can correspond to completion of one or more workflow steps within the workflow. In certain embodiments, the workflow vector data structure and/or the defined workflow action can be detected based on workflow action criteria. The workflow action criteria can include workflow status criteria, workflow transition criteria, and/or other criteria related to movement within a workflow. Additionally or alternatively, the workflow action criteria can be related to workflow attributes and/or metadata for a workflow. In an example, the workflow vector data structure and/or the defined workflow action can be detected based on determining whether the defined workflow action satisfies a defined status for one or more workflows within one or more application components. In another example, the workflow vector data structure and/or the defined workflow action can be detected based on determining whether the defined workflow action satisfies a defined transition for one or more workflows within one or more application components.

In various embodiments, the application management apparatus 120 such as, for example, the application framework circuitry 210 of the application management apparatus 120, can detect, for the distributed ledger 310, the candidate transaction 304 based on monitoring of the workflow event stream 302. In various embodiments, the candidate transaction 304 can be associated with the defined workflow action. In certain embodiments, the application management apparatus 120 such as, for example, the application framework circuitry 210 of the application management apparatus 120, can receive a request to commit the candidate transaction 304 to the distributed ledger 310. In certain embodiments, the application management apparatus 120 can receive the request from a user identifier (e.g., a user identifier associated with a first client device of the client devices 102a-n). In certain embodiments, the application management apparatus 120 can receive the request in response to a predefined workflow event associated with the workflow event stream 302. Additionally or alternatively, the application management apparatus 120 can receive the request from a user identifier via a user interface of a client device associated with the user identifier.

Additionally, the application management apparatus 120 such as, for example, the application framework circuitry 210 of the application management apparatus 120, can generate a candidate transaction data structure 306 for the candidate transaction 304. The candidate transaction data structure 306 can be configured as a data block for the distributed ledger 310. In certain embodiments, the distributed ledger 310 can be a blockchain. In one or more embodiments, the candidate transaction data structure 306 can be generated in accordance with one or more candidate transaction attributes of the candidate transaction 304. In one or more embodiments, the candidate transaction data structure 306 can be generated in accordance with one or more attributes related to one or more workflow vector data structures for defined workflow actions associated with the workflow event stream 302. For example, the one or more candidate transaction attributes of the candidate transaction 304 can be associated with metadata, events, actions, user engagement, incidents, changes, component requests, API calls, scheduling, alerting, workflows and/or other dynamic data associated with the defined workflow action.

In one or more embodiments, the smart contract 112 can be executed to add the candidate transaction data structure 306 to the distributed ledger 310 based on a comparison between the one or more candidate transaction attributes of the candidate transaction 304 and smart contract rules for the smart contract 112. In various embodiments, the smart contract 112 can be executed to add the candidate transaction data structure 306 to the distributed ledger 310 in accordance with a distributed ledger consensus protocol such as, for example, a proof-of-work protocol, a blockchain consensus protocol, or another type of consensus protocol such that computing nodes of the distributed ledger network can reach a common agreement as to the authorization of the candidate transaction data structure 306.

The smart contract rules can be predefined rules embedded into the smart contract 112 such that a candidate transaction data structure is authorized to be added to the distributed ledger 310 in response to the smart contract rules being satisfied. In one or more embodiments, the smart contract rules can include a predefined rule set associated with predefined events for the workflow event stream 302. In various embodiments, the predefined events can correspond to predefined actions, predefined workflows, and/or designated activities with respect to the workflow event stream 302. The application management apparatus 120 such as, for example, the distributed ledger circuitry 212, can configure the smart contract rules for the smart contract 112 with the predefined rule set. The smart contract rules for the smart contract 112 can be configured by one or more user identifiers with respect to the application framework 106. Additionally or alternatively, the smart contract rules for the smart contract 112 can be predetermined smart contract rules associated with the application framework system 105 and/or the application framework 106 that manages workflows. In various embodiments, the application management apparatus 120 such as, for example, the distributed ledger circuitry 212, can configure the predefined rule set based on one or more latency requirements for one or more workflows within one or more application components of the application framework 106. In various embodiments, the application management apparatus 120 such as, for example, the distributed ledger circuitry 212, can configure the predefined rule set based on one or more defined workflow actions for one or more workflows within one or more application components of the application framework 106. In various embodiments, the application management apparatus 120 such as, for example, the distributed ledger circuitry 212, can configure the predefined rule set based on event objectives for user identifiers. In various embodiments, the application management apparatus 120 such as, for example, the distributed ledger circuitry 212, can modify one or more smart contract rules of the smart contract rules based on a first authorization associated with the first user identifier and/or a second authorization associated with the second user identifier.

The application management apparatus 120 such as, for example, the distributed ledger circuitry 212, can additionally be configured to trigger one or more workflows 312 for one or more application components managed by the application framework 106. For instance, in one or more embodiments, the application management apparatus 120 such as, for example, the distributed ledger circuitry 212, can be configured to trigger the one or more workflows 312 based on the candidate transaction data structure 306 being added to the distributed ledger 310. The one or more workflows 312 can be one or more new workflows for one or more components of the application framework 106. In various embodiments, a workflow of the one or more workflows 312 can include a set of actions, a set of statuses, and/or a set of transitions that represent one or more processes related to one or more components of the application framework 106. Additionally or alternatively, a workflow of the one or more workflows 312 can include a set of instructions for one or more operations and/or rendering of data via an electronic interface of a client device.

In certain embodiments, the application management apparatus 120 such as, for example, the distributed ledger circuitry 212, can be configured to trigger at least a first workflow (e.g., a first type of workflow and/or workflow operation) for a first application component managed by the application framework 106 and a second workflow (e.g., a second type of workflow and/or workflow operation) for a second application component managed by the application framework 106 based on the candidate transaction data structure 306 being added to the distributed ledger 310. For example, the first workflow can be a Jira® workflow and the second workflow can be a Trello® workflow. Accordingly, multiple workflows and/or workflow operations for one or more application components can be triggered in parallel based on the candidate transaction data structure 306 being added to the distributed ledger 310. In various embodiments, triggering of the one or more workflows 312 can result in one or more notifications for an electronic interface of a client device from the one or more client devices 102a-n being generated. For example, one or more notifications for an electronic interface of a client device from the one or more client devices 102a-n can be generated based on the candidate transaction data structure 306 being added to the distributed ledger 310. Additionally or alternatively, triggering of the one or more workflows 312 can result in one or more task board graphical elements for an electronic interface of a client device from the one or more client devices 102a-n being generated. For example, one or more task board graphical elements for an electronic interface of a client device from the one or more client devices 102a-n can be generated based on the candidate transaction data structure 306 being added to the distributed ledger 310.

In various embodiments, the one or more workflows 312 can be triggered based on a classification for the defined workflow action associated with the candidate transaction 304. Additionally or alternatively, the one or more workflows 312 can be triggered based on a classification for one or more candidate transaction attributes of the candidate transaction 304. Additionally or alternatively, the one or more workflows 312 can be triggered based on a user identifier related to the defined workflow action associated with the candidate transaction 304. Additionally or alternatively, the one or more workflows 312 can be triggered based on a group of user identifiers that includes a user identifier related to the defined workflow action associated with the candidate transaction 304. Additionally or alternatively, the one or more workflows 312 can be triggered based on one or more smart contract rules for the smart contract 112.

In various embodiments, the application management apparatus 120 such as, for example, the distributed ledger circuitry 212, can be configured to modify the digital asset repository 114 based on the candidate transaction data structure 306 added to the distributed ledger 310. For example, the application management apparatus 120 such as, for example, the distributed ledger circuitry 212, can add one or more digital tokens associated with the candidate transaction data structure 306 to the digital asset repository 114. In certain embodiments, adding the candidate transaction data structure 306 to the distributed ledger 310 can result in an increase of a digital asset count in the digital asset repository 114. Furthermore, the one or more workflows 312 can be triggered based on a type of digital asset added to the digital asset repository 114. In certain embodiments, the one or more workflows 312 can be triggered when a total digital asset count for the digital asset repository 114 satisfies a predefined digital asset threshold.

Figure 4:
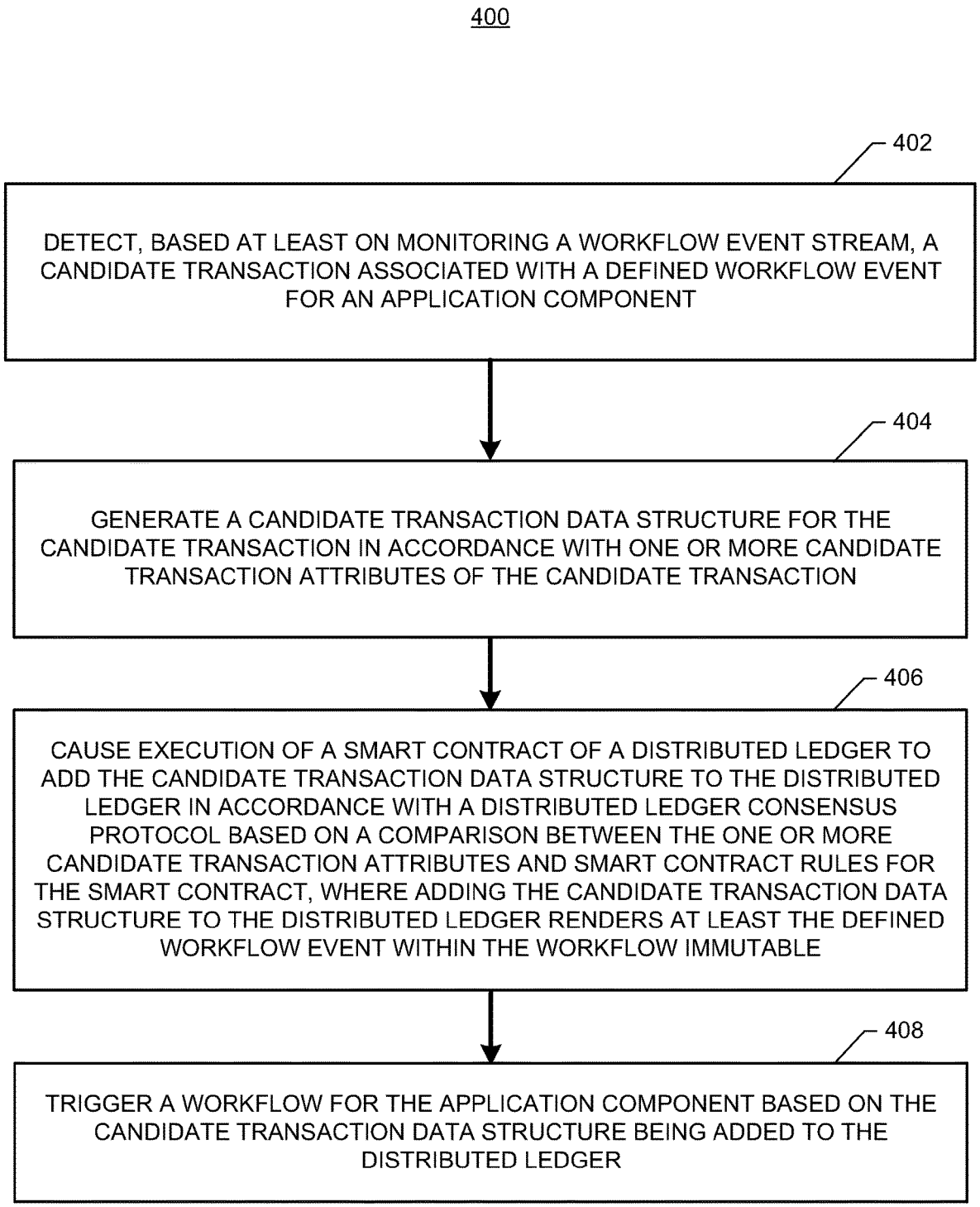
FIG. 4 is a flowchart diagram for triggering application component workflows based on a distributed ledger in accordance with one or more embodiments of the present disclosure.

FIG. 4 is a flowchart diagram of an example process 400 for triggering application component workflows based on a distributed ledger, in accordance with, for example, the application management apparatus 120. Via the various operations of process 400, the application management apparatus 120 can enhance efficiency, reliability and/or effectiveness of the application framework 106 and/or a distributed ledger associated with the distributed ledger system 110.

The process 400 begins at operation 402 where a candidate transaction associated with a defined workflow action for an application component is detected based at least on monitoring a workflow event stream. At operation 404, a candidate transaction data structure for the candidate transaction is generated in accordance with one or more candidate transaction attributes of the candidate transaction. At operation 406, execution of a smart contract of a distributed ledger is caused to add the candidate transaction data structure to the distributed ledger in accordance with a distributed ledger consensus protocol based on a comparison between the one or more candidate transaction attributes and smart contract rules for the smart contract, where adding the candidate transaction data structure to the distributed ledger renders at least the defined workflow action within the workflow immutable. At operation 408, a workflow for the application component is triggered based on the candidate transaction data structure being added to the distributed ledger.

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Figure 5:
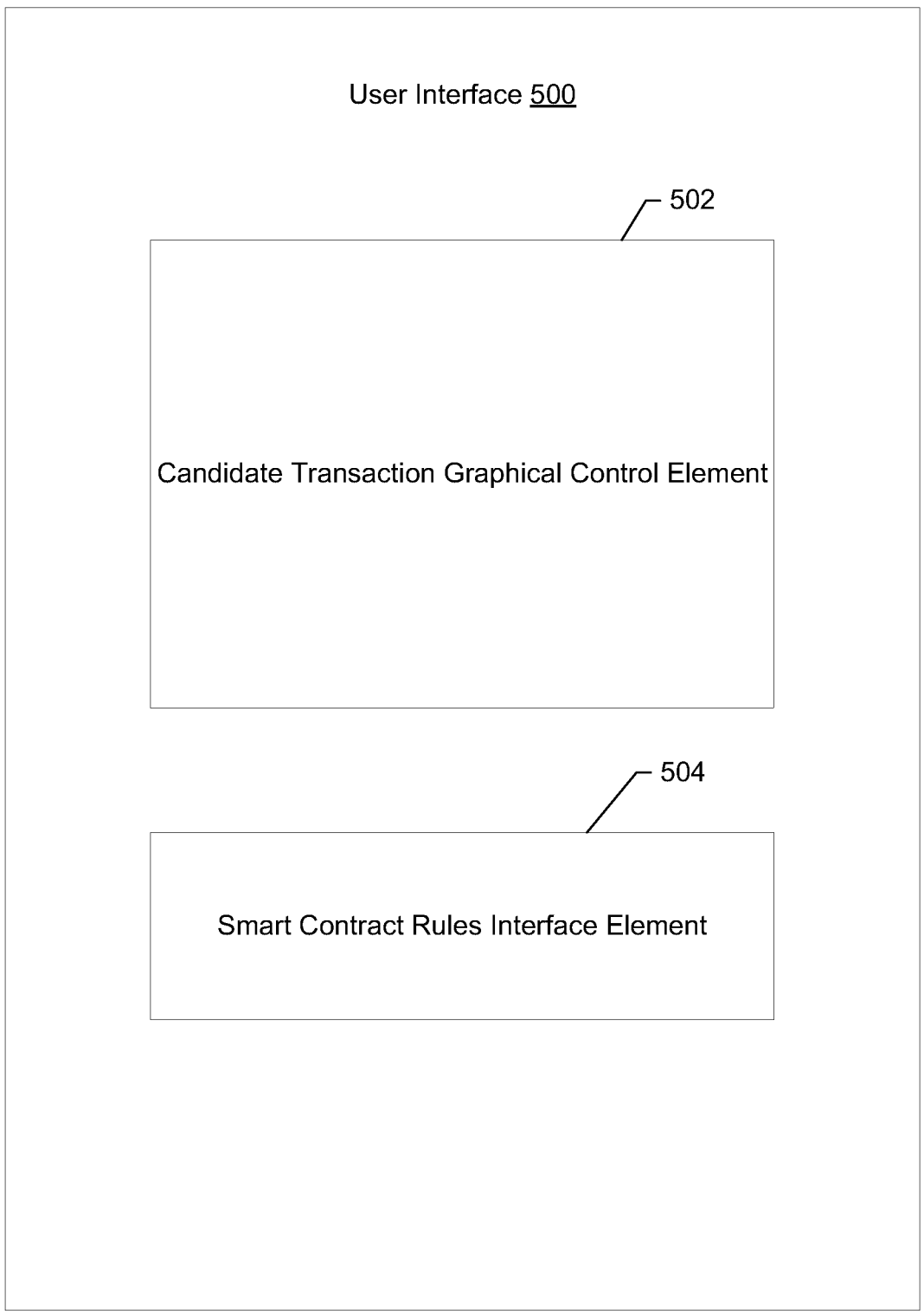
FIG. 5 illustrates an example user interface in accordance with one or more embodiments of the present disclosure.

Referring now to FIG. 5, an example user interface 500 is presented in accordance with one or more embodiments of the present disclosure. The user interface 500 can be, for example, an electronic interface (e.g., a graphical user interface) of a client device (e.g., the client devices 102a-n). In one or more embodiments, the user interface 500 includes a candidate transaction graphical control element 502 and/or a smart contract rules interface element 504. The candidate transaction graphical control element 502 and/or the smart contract rules interface element 504 may correspond to respective interface areas of the user interface 500. The candidate transaction graphical control element 502 can facilitate one or more actions with respect to a workflow, a collaborative document, a project management application, a work management application, a service management application, a software development application, a product development application, a portfolio management application, a collaborative application, or another type of application managed by the application framework 106. In certain embodiments, the candidate transaction graphical control element 502 can facilitate generation of one or more candidate transactions (e.g., the candidate transaction 304) for a distributed ledger. The one or more candidate transactions can be associated with one or more user identifiers. In one or more embodiments, the candidate transaction graphical control element 502 facilitates creating, viewing, updating, and/or deleting data associated with a workflow, a collaborative a collaborative document, a project management application, a work management application, a service management application, a software development application, a product development application, a portfolio management application, a collaborative application, or another type of application managed by the application framework 106. In one or more embodiments, the candidate transaction graphical control element 502 facilitates user interface navigation and/or interaction with extensibility points and/or nodes of a workflow, a collaborative document, a project management application, a work management application, a service management application, a software development application, a product development application, a portfolio management application, a collaborative application, or another type of application managed by the application framework 106.

The smart contract rules interface element 504 can facilitate one or more actions with respect to the smart contract 112. For example, the smart contract rules interface element 504 can be configured to generate smart contract rules for the smart contract 112. In certain embodiments, the smart contract rules interface element 504 can be configured to generate a predefined rule set associated with predefined workflow events for a workflow, a collaborative document, a project management application, a work management application, a service management application, a software development application, a product development application, a portfolio management application, a collaborative application, or another type of application managed by the application framework 106. In certain embodiments, the smart contract rules interface element 504 can be configured to additionally or alternatively generate a predefined rule set associated with a user identifier and/or a group of user identifiers that interact with a workflow, a collaborative document, a project management application, a work management application, a service management application, a software development application, a product development application, a portfolio management application, a collaborative application, or another type of application managed by the application framework 106.

Figure 6A:
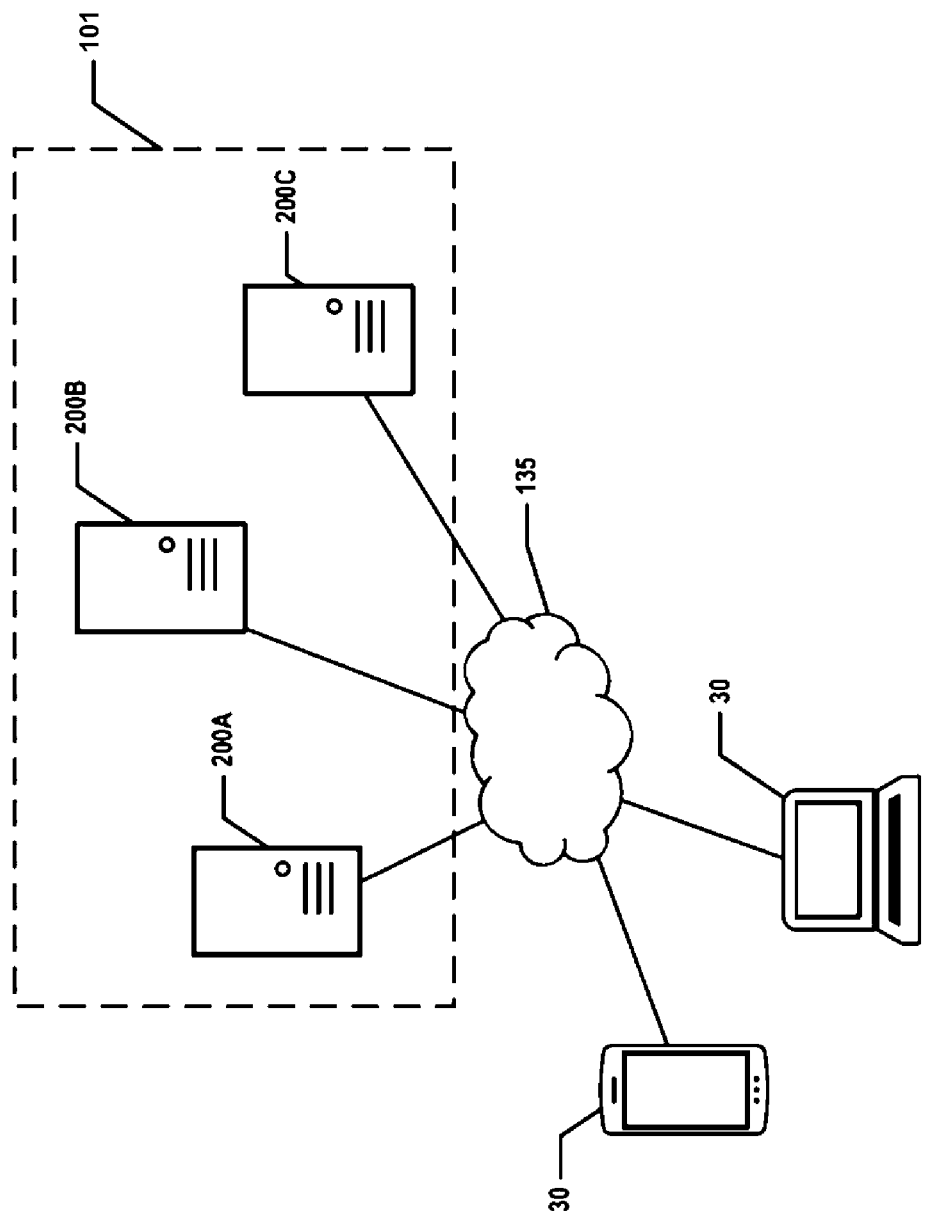
FIG. 6A illustrates an example diagram of a system that can be used to practice one or more embodiments of the present disclosure.

FIG. 6A provides an illustration of a system that can be used in accordance with one or more embodiments of the present disclosure. As shown in FIG. 6A, the system may comprise a distributed platform 101 comprising two or more node computing entities 201 (e.g., 200A, 200B, 200C). In various embodiments, the distributed ledger 310 can be implemented via the two or more node computing entities 201 (e.g., 200A, 200B, 200C). As shown in FIG. 6A, the system may further comprise one or more non-node computing entities 30, one or more networks 135, and/or the like. In various embodiments, the one or more networks 135 correspond to one or more portions of the network 104 illustrated in FIG. 1.

Figure 6B:
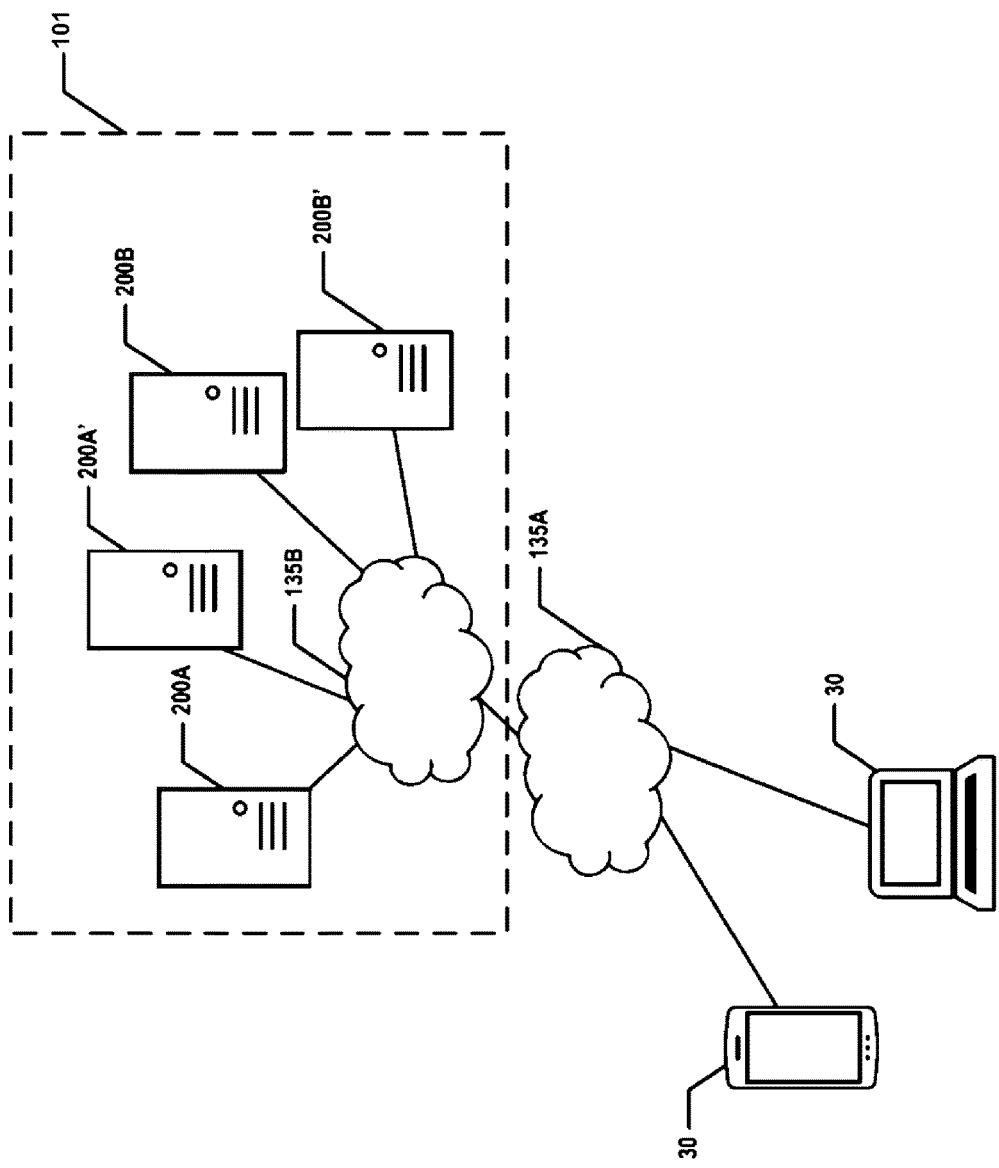
FIG. 6B illustrates an example diagram of another system that can be used to practice one or more embodiments of the present disclosure.

FIG. 6B provides an illustration of another system that can be used in conjunction with various embodiments of the present invention. As shown in FIG. 6B, the system may comprise a distributed platform 101 comprising two or more node computing entities 201 (e.g., 200A, 200B), 200' (e.g., 200A', 200B'), one or more external networks 135A, and/or one or more internal networks 135B. For example, in an example embodiment, the distributed platform 101 comprises a plurality of node computing entities 201, 200' in communication with one another via a network 135B. In various embodiments, the distributed ledger 310 can be implemented via the two or more node computing entities 201 (e.g., 200A, 200B), 200' (e.g., 200A', 200B'). The network 135B may be an internal or private network.

As shown in FIG. 6B, the system may further comprise one or more non-node computing entities 30, one or more other and/or external networks 135A, and/or the like. For example, the other and/or external network 135A may be external, public, and/or a different network from the internal and/or private network 135B. In various embodiments, the one or more external networks 135A correspond to one or more portions of the network 104 illustrated in FIG. 1. Each of the components of the system may be in electronic communication with, for example, one another over the same or different wireless or wired networks 135 including, for example, a wired or wireless PAN, LAN, MAN, WAN, or the like. Additionally, while FIGS. 6A and/or 6B illustrate certain system entities as separate, standalone entities, the various embodiments are not limited to this particular architecture.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web components, web services, web microservices, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus comprising one or more processors and one or more storage devices storing instructions that are operable, when executed by the one or more processors, to cause the one or more processors to:
   generate smart contract rules associated with a distributed ledger based at least in part on one or more defined workflow events associated with an application framework;
   generate a smart contract of the distributed ledger based at least in part on the smart contract rules, wherein execution of the smart contract causes one or more candidate transaction data structure to be added to the distributed ledger in response to the smart contract rules being satisfied;
   monitor a workflow event stream associated with one or more workflow events triggered by a user computing device interacting with one or more application components of the application framework via a network;
   detect, based at least on the workflow event stream, a candidate transaction associated with a defined workflow event for a first application component of the application framework;
   generate a candidate transaction data structure for the candidate transaction in accordance with one or more candidate transaction attributes of the candidate transaction;
   cause execution of the smart contract of the distributed ledger to add the candidate transaction data structure to the distributed ledger in accordance with a distributed ledger consensus protocol based on a comparison between the one or more candidate transaction attributes and the smart contract rules for the smart contract, wherein adding the candidate transaction data structure to the distributed ledger renders at least the defined workflow event within the workflow immutable; and
   based on the candidate transaction data structure being added to the distributed ledger, generate (i) a first type of workflow for the first application component and (ii) a second type of workflow for a second application component of the application framework, wherein the second type of workflow is configured for execution in parallel to the first type of workflow, and wherein the first application component is accessible via a first application programming interface and the second application component is accessible via a second application programming interface.

2. The apparatus of claim 1, wherein the one or more storage devices store instructions that are operable, when executed by the one or more processors, to further cause the one or more processors to:
   generate the first type of workflow for the first application component based on a classification for the defined workflow event.

3. The apparatus of claim 1, wherein the one or more storage devices store instructions that are operable, when executed by the one or more processors, to further cause the one or more processors to:
   generate the first type of workflow for the first application component based on a classification for the one or more candidate transaction attributes of the candidate transaction.

4. The apparatus of claim 1, wherein the one or more storage devices store instructions that are operable, when executed by the one or more processors, to further cause the one or more processors to:
   generate the first type of workflow for the first application component based on a user identifier associated with the defined workflow event.

5. The apparatus of claim 1, wherein the one or more storage devices store instructions that are operable, when executed by the one or more processors, to further cause the one or more processors to:
   generate the first type of workflow for the first application component based on a group of user identifiers that comprises a user identifier associated with the defined workflow event.

6. The apparatus of claim 1, wherein the one or more storage devices store instructions that are operable, when executed by the one or more processors, to further cause the one or more processors to:
   generate the first type of workflow for the first application component based on the smart contract rules for the smart contract.

7. The apparatus of claim 1, wherein adding the candidate transaction data structure to the distributed ledger results in an increase of a digital asset count, in a digital asset repository, for a user identifier associated with the candidate transaction, and wherein the one or more storage devices store instructions that are operable, when executed by the one or more processors, to further cause the one or more processors to:
   generate the first type of workflow for the first application component based on a type of digital asset added to the digital asset repository.

8. The apparatus of claim 7, wherein the one or more storage devices store instructions that are operable, when executed by the one or more processors, to further cause the one or more processors to:
   generate the first type of workflow for the first application component when a total digital asset count for the digital asset repository satisfies a predefined digital asset threshold.

9. The apparatus of claim 1, wherein the one or more storage devices store instructions that are operable, when executed by the one or more processors, to further cause the one or more processors to:
generate a notification for an electronic interface based on the candidate transaction data structure being added to the distributed ledger.

10. The apparatus of claim 1, wherein the one or more storage devices store instructions that are operable, when executed by the one or more processors, to further cause the one or more processors to:
generate a task board graphical element for an electronic interface based on the candidate transaction data structure being added to the distributed ledger.

11. The apparatus of claim 1, wherein the one or more storage devices store instructions that are operable, when executed by the one or more processors, to further cause the one or more processors to:
determine whether the defined workflow event satisfies a defined status for one or more workflows within the first application component.

12. The apparatus of claim 1, wherein the one or more storage devices store instructions that are operable, when executed by the one or more processors, to further cause the one or more processors to:
determine whether the defined workflow event satisfies a defined transition for one or more workflows within the first application component.

13. The apparatus of claim 1, wherein the one or more storage devices store instructions that are operable, when executed by the one or more processors, to further cause the one or more processors to:
generate the candidate transaction data structure for the candidate transaction based on metadata included a workflow vector data structure associated with the defined workflow event.

14. The apparatus of claim 1, wherein the smart contract rules for the smart contract are configured by one or more user identifiers authorized with respect to the first application component.

15. The apparatus of claim 1, wherein the smart contract rules for the smart contract are predetermined smart contract rules associated with the application framework.

16. The apparatus of claim 1, wherein the one or more storage devices store instructions that are operable, when executed by the one or more processors, to further cause the one or more processors to:
configure one or more smart contract rules of the smart contract rules based on one or more latency requirements for a workflow.

17. The apparatus of claim 1, wherein the one or more storage devices store instructions that are operable, when executed by the one or more processors, to further cause the one or more processors to:
configure one or more smart contract rules of the smart contract rules based on one or more defined workflow events for a workflow.

18. The apparatus of claim 1, wherein the one or more storage devices store instructions that are operable, when executed by the one or more processors, to further cause the one or more processors to:
augment a digital asset repository with a digital asset based the candidate transaction data structure being added to the distributed ledger; and
generate the first type of workflow for the first application component based on a digital asset type associated with the digital asset added to the digital asset repository.

19. A computer-implemented method, comprising:
generating smart contract rules associated with a distributed ledger based at least in part on one or more defined workflow events associated with an application framework;
generating a smart contract of the distributed ledger based at least in part on the smart contract rules, wherein execution of the smart contract causes one or more candidate transaction data structure to be added to the distributed ledger in response to the smart contract rules being satisfied;
monitoring a workflow event stream associated with one or more workflow events triggered by a user computing device interacting with one or more application components of the application framework via a network;
detecting, based at least on the workflow event stream, a candidate transaction associated with a defined workflow event for a first application component of the application framework;
generating a candidate transaction data structure for the candidate transaction in accordance with one or more candidate transaction attributes of the candidate transaction;
causing execution of the smart contract of the distributed ledger to add the candidate transaction data structure to the distributed ledger in accordance with a distributed ledger consensus protocol based on a comparison between the one or more candidate transaction attributes and the smart contract rules for the smart contract, wherein adding the candidate transaction data structure to the distributed ledger renders at least the defined workflow event within the workflow immutable; and
based on the candidate transaction data structure being added to the distributed ledger, generating (i) a first type of workflow for the first application component and (ii) a second type of workflow for a second application component of the application framework, wherein the second type of workflow is configured for execution in parallel to the first type of workflow, and wherein the first application component is accessible via a first application programming interface and the second application component is accessible via a second application programming interface.

20. The computer-implemented method of claim 19, wherein generating the workflow comprises triggering the first type of workflow for the first application component based on a classification for the defined workflow event.

21. The computer-implemented method of claim 19, wherein generating the workflow comprises triggering the first type of workflow for the first application component based on a classification for the one or more candidate transaction attributes of the candidate transaction.

22. The computer-implemented method of claim 19, wherein generating the workflow comprises triggering the first type of workflow for the first application component based on a user identifier associated with the defined workflow event.

23. The computer-implemented method of claim 19, wherein generating the workflow comprises triggering the first type of workflow for the first application component based on a group of user identifiers that comprises a user identifier associated with the defined workflow event.

24. The computer-implemented method of claim 19, wherein generating the workflow comprises triggering the first type of workflow for the first application component based on the smart contract rules for the smart contract.

25. The computer-implemented method of claim 19, wherein adding the candidate transaction data structure to the distributed ledger results in an increase of a digital asset count, in a digital asset repository, for a user identifier associated with the candidate transaction, and wherein the triggering the workflow comprises triggering the first type of workflow for the first application component based on a type of digital asset added to the digital asset repository.

26. The computer-implemented method of claim 19, wherein generating the workflow comprises triggering the first type of workflow for the first application component when a total digital asset count for the digital asset repository satisfies a predefined digital asset threshold.

27. The computer-implemented method of claim 19, further comprising:
generating a notification for an electronic interface based on the candidate transaction data structure being added to the distributed ledger.

28. The computer-implemented method of claim 19, further comprising:
generating a task board graphical element for an electronic interface based on the candidate transaction data structure being added to the distributed ledger.

29. The computer-implemented method of claim 19, further comprising:
determining whether the defined workflow event satisfies a defined status for one or more workflows within the first application component.

30. The computer-implemented method of claim 19, further comprising:
determining whether the defined workflow event satisfies a defined transition for one or more workflows within the first application component.

31. The computer-implemented method of claim 19, wherein the generating the candidate transaction data structure comprises generating the candidate transaction data structure for the candidate transaction based on metadata included a workflow vector data structure associated with the defined workflow event.

32. The computer-implemented method of claim 19, wherein the smart contract rules for the smart contract are configured by one or more user identifiers authorized with respect to the first application component.

33. The computer-implemented method of claim 19, wherein the smart contract rules for the smart contract are predetermined smart contract rules associated with the application framework.

34. The computer-implemented method of claim 19, further comprising:
configuring one or more smart contract rules of the smart contract rules based on one or more latency requirements for a workflow.

35. The computer-implemented method of claim 19, further comprising:
configuring one or more smart contract rules of the smart contract rules based on one or more defined workflow events for a workflow.

36. The computer-implemented method of claim 19, further comprising:
augmenting a digital asset repository with a digital asset based the candidate transaction data structure being added to the distributed ledger; and
generating the first type of workflow for the first application component based on a digital asset type associated with the digital asset added to the digital asset repository.

37. A computer program product, stored on a non-transitory computer readable medium, comprising instructions that when executed by one or more computers cause the one or more computers to:
generate smart contract rules associated with a distributed ledger based at least in part on one or more defined workflow events associated with an application framework;
generate a smart contract of the distributed ledger based at least in part on the smart contract rules, wherein execution of the smart contract causes one or more candidate transaction data structure to be added to the distributed ledger in response to the smart contract rules being satisfied;
monitor a workflow event stream associated with one or more workflow events triggered by a user computing device interacting with one or more application components of the application framework via a network;
detect, based at least on the workflow event stream, a candidate transaction associated with a defined workflow event for a first application component of the application framework;
generate a candidate transaction data structure for the candidate transaction in accordance with one or more candidate transaction attributes of the candidate transaction;
cause execution of the smart contract of the distributed ledger to add the candidate transaction data structure to the distributed ledger in accordance with a distributed ledger consensus protocol based on a comparison between the one or more candidate transaction attributes and the smart contract rules for the smart contract, wherein adding the candidate transaction data structure to the distributed ledger renders at least the defined workflow event within the workflow immutable; and
based on the candidate transaction data structure being added to the distributed ledger, generate (i) a first type of workflow for the first application component and (ii) a second type of workflow for a second application component of the application framework, wherein the second type of workflow is configured for execution in parallel to the first type of workflow, and wherein the first application component is accessible via a first application programming interface and the second application component is accessible via a second application programming interface.

38. The computer program product of claim 37, further comprising instructions that when executed by the one or more computers cause the one or more computers to:
generate the first type of workflow for the first application component based on a classification for the defined workflow event.

39. The computer program product of claim 37, further comprising instructions that when executed by the one or more computers cause the one or more computers to:
generate the first type of workflow for the first application component based on a classification for the one or more candidate transaction attributes of the candidate transaction.

40. The computer program product of claim 37, further comprising instructions that when executed by the one or more computers cause the one or more computers to:
generate the first type of workflow for the first application component based on a user identifier associated with the defined workflow event.

41. The computer program product of claim 37, further comprising instructions that when executed by the one or more computers cause the one or more computers to:
generate the first type of workflow for the first application component based on a group of user identifiers that comprises a user identifier associated with the defined workflow event.

42. The computer program product of claim 37, further comprising instructions that when executed by the one or more computers cause the one or more computers to:
generate the first type of workflow for the first application component based on the smart contract rules for the smart contract.

43. The computer program product of claim 37, wherein adding the candidate transaction data structure to the distributed ledger results in an increase of a digital asset count, in a digital asset repository, for a user identifier associated with the candidate transaction, and further comprising instructions that when executed by the one or more computers cause the one or more computers to:
generate the first type of workflow for the first application component based on a type of digital asset added to the digital asset repository.

44. The computer program product of claim 37, further comprising instructions that when executed by the one or more computers cause the one or more computers to:
generate the first type of workflow for the first application component when a total digital asset count for the digital asset repository satisfies a predefined digital asset threshold.

45. The computer program product of claim 37, further comprising instructions that when executed by the one or more computers cause the one or more computers to:
generate a notification for an electronic interface based on the candidate transaction data structure being added to the distributed ledger.

46. The computer program product of claim 37, further comprising instructions that when executed by the one or more computers cause the one or more computers to:
generate a task board graphical element for an electronic interface based on the candidate transaction data structure being added to the distributed ledger.

47. The computer program product of claim 37, further comprising instructions that when executed by the one or more computers cause the one or more computers to:
determine whether the defined workflow event satisfies a defined status for one or more workflows within the first application component.

48. The computer program product of claim 37, further comprising instructions that when executed by the one or more computers cause the one or more computers to:
determine whether the defined workflow event satisfies a defined transition for one or more workflows within the first application component.

49. The computer program product of claim 37, further comprising instructions that when executed by the one or more computers cause the one or more computers to:
generate the candidate transaction data structure for the candidate transaction based on metadata included a workflow vector data structure associated with the defined workflow event.

50. The computer program product of claim 37, wherein the smart contract rules for the smart contract are configured by one or more user identifiers authorized with respect to the first application component.

51. The computer program product of claim 37, wherein the smart contract rules for the smart contract are predetermined smart contract rules associated with the application framework.

52. The computer program product of claim 37, further comprising instructions that when executed by the one or more computers cause the one or more computers to:
configure one or more smart contract rules of the smart contract rules based on one or more latency requirements for a workflow.

53. The computer program product of claim 37, further comprising instructions that when executed by the one or more computers cause the one or more computers to:
configure one or more smart contract rules of the smart contract rules based on one or more defined workflow events for a workflow.

54. The computer program product of claim 37, further comprising instructions that when executed by the one or more computers cause the one or more computers to:
augment a digital asset repository with a digital asset based the candidate transaction data structure being added to the distributed ledger; and
generate the first type of workflow for the first application component based on a digital asset type associated with the digital asset added to the digital asset repository.

* * * * *